United States Patent
Kamimaki et al.

(10) Patent No.: US 6,201,693 B1
(45) Date of Patent: Mar. 13, 2001

(54) INFORMATION PROCESSING UNIT AND INFORMATION PROCESSING RELATED UNITS

(75) Inventors: Hideki Kamimaki, Fujisawa; Yukihide Inagaki, Yokohama; Tsuyoshi Nakagawa, Hadano; Koichi Kimura, Kamakura; Hideaki Gemma, Hadano; Hitoshi Kawaguchi, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/063,444

(22) Filed: Apr. 21, 1998

(30) Foreign Application Priority Data

Apr. 23, 1997 (JP) ................................... 9-105744

(51) Int. Cl.[7] ........................................ G06F 1/16
(52) U.S. Cl. .......................... 361/686; 361/685; 361/725
(58) Field of Search .................... 361/686, 685, 361/725, 732, 754, 785, 798

(56) References Cited

U.S. PATENT DOCUMENTS

| | | | |
|---|---|---|---|
| 5,561,589 | * 10/1996 | Mesfin et al. | 361/686 |
| 5,805,412 | * 9/1998 | Yanagisawa et al. | 361/686 |
| 5,840,245 | * 11/1998 | Coombs et al. | 422/4 |
| 5,870,283 | * 2/1999 | Maeda et al. | 361/686 |
| 5,933,322 | * 8/1999 | Ruch et al. | 361/686 |

* cited by examiner

*Primary Examiner*—Leo P. Picard
*Assistant Examiner*—Hung Van Duong
(74) *Attorney, Agent, or Firm*—Antonelli, Terry, Stout & Kraus, LLP

(57) ABSTRACT

A labor of disconnecting many cables is omitted even when carrying a file basestation with an external storage loaded together with a main body. An information processing unit comprises: a main body having a CPU, a keyboard and a display unit; a file basestation with an external storage, such as an FD•D or a CD-ROM•D, loaded; and a portreplicator with many connectors loaded. Removal of the main body alone from the portreplicator or removal of the main body and the file basestation can omit the labor of disconnecting many cables connected to the portreplicator.

16 Claims, 37 Drawing Sheets

INFORMATION PROCESSING UNIT AND INFORMATION PROCESSING RELATED UNITS

TECHNICAL FIELD

The present invention relates to an information processing unit comprising a main body of information processing unit referred to as portable computer or the like and a device for extending the function of this main body.

BACKGROUND ART

Some conventional information processing unit comprises a main body having a CPU, a keyboard and a display unit, and a file basestation having an external storage such as floppy disk drive (hereinafter, abbreviated to FD • D). Normally, with the main body placed on the file basestation, this information processing unit is used in a combined state of both, whereas, disconnected from the file basestation, the main body alone is used at the moving time of an operator. In the file basestation, many connectors for the signal connection to various external equipment are provided, whereas the number of connectors for the signal connection to external equipment is reduced to the necessary minimum in the main body. Such a provision of many connectors and the like in the file basestation is because, if the main body and a plurality of external equipment are cable-connected via connectors, there occurs the need for individually disconnecting the cables connected to the main body when an operator disconnects the main body from the file basestation and uses the main body alone to move to somewhere else.

Like this, in the background art, the information processing unit comprises two bodies of the main body and the other device (here, file basestation), while the function of the main body on one side is minimized and a function to be extended is afforded to the other device, thus promoting the function furnished as information processing unit and maintaining the portability of the main body on the other hand.

Incidentally, those composed of two bodies of the main body and the other device are described in Japanese Patent Unexamined Publication No. 8-123589 and the like.

In the background art mentioned above, however, there are problems that many cables connected to many connectors of a file basestation must be disconnected, thus taking awfully much labor, when one needs the external storage together with the main body of information processing unit at the moved site and goes with the file basestation as well as the main body.

The present invention is made with an eye to such conventional problems and its object is to provide an information processing unit and the information processing related unit in which no labor on disconnecting many cables is required when one goes with the file basestation as well as the main body while maintaining the portability of the main body.

DISCLOSURE OF THE INVENTION

The first information processing unit for attaining the object mentioned above is an information processing unit with a keyboard, a display unit, a plurality of external storages and a plurality of connectors for the signal connection to external equipment, comprising:

a main body having the keyboard, a CPU, a memory, a main body casing and the display unit attached to the main body casing;

a file basestation having the external storages and a file basestation casing for housing them; and a portreplicator having the connectors and a portreplicator casing for mounting it, wherein the main body has a first docking connector on the main processing unit side for receiving/sending a signal with the above basestation and a second docking connector on the main processing unit side for receiving/sending a signal with the portreplicator; the file basestation has a docking connector on the file basestation directly connected to the first docking connector on the main processing unit side for receiving/sending a signal with the main body; and the portreplicator has a docking connector on the portreplicator directly connected to the second docking connector on the main processing unit side for receiving/sending a signal with the main body.

Incidentally, in the above description, "direct connection" between connectors means that the connectors are connected to each other not via a cable or the like.

Besides, a second information processing unit for attaining the object mentioned above is the first information processing unit, wherein the main body casing, taking the shape of a nearly rectangular parallelopiped, has a top plate with the key face of the keyboard exposed therefrom, a bottom plate opposed to the top plate, a front plate facing to the side of properly operating the keyboard, a back plate opposed to the front plate and two side plates opposed to each other, the file basestation casing in the shape of a nearly rectangular parallelopiped has top and bottom plates mutually opposed to each other, front and back plates mutually opposed to each other at a distance substantially identical to the mutual one of the front and back plates of the main body casing and two side plates opposed to each other at a distance substantially identical to the mutual one of the side plates of the main body casing, the portreplicator has top and bottom plates mutually opposed to each other, front and back plates mutually opposed to each other and two side plates opposed to each other at a distance substantially identical to the mutual one of the side plates of the main body casing, the first docking connector on the main processing unit side of the main body is provided on the bottom plate of the main body casing, the second docking connector on the main processing unit side of the main body is provided on the back plate of the main body casing, the docking connector on the file basestation side is provided at a position as comes into contact with the first docking connector on the main processing unit side when bringing the top plate of the file basestation casing into contact with the bottom plate of the main body casing, making the front plate of the file basestation casing substantially coincident in position with the front plate of the main body casing and making the side plates of the file basestation casing substantially coincident in position with the side plates of the main body casing, and the docking connector on the portreplicator side is provided at a position as comes into contact with the second docking connector on the main processing unit side when bringing the top plate of the portreplicator casing into contact with the back plate of the main body casing, making the two side plates of the portreplicator casing substantially coincident in position with the two side plates of the main body casing.

A third information processing unit for attaining the object mentioned above is the second information processing unit, further comprising: a height adjusting stand having a top plate in contact with the bottom plate of the portreplicator casing and a bottom plate opposed to the top plate wherein the spacing between the top plate and the bottom plate is substantially equal to the spacing between the top plate and the bottom plate of the file basestation.

A fourth information processing unit for attaining the object mentioned is any one of the above information processing units, wherein the external storage has a connector detachable from the file basestation casing for receiving/sending a signal with the main body and an external storage connector directly or indirectly connectable to the connector of the external storage is provided on the surface of the main body casing.

A fifth information processing unit for attaining the object mentioned above is the second or third information processing unit, wherein the external storage has a connector detachable from the file basestation casing for receiving/sending a signal with the main body, an external storage connector directly or indirectly connectable to the connector of the external storage is provided on any one plate of the front plate, the back plate and both the lateral plates and a connector connection regulating member is provided which covers at least a part of the external storage connector provided on the main body casing in directly connecting the first docking connector on the main processing unit side to the docking connector on the file basestation.

Besides, a sixth information processing unit for attaining the object mentioned above is any one of the above information processing units, further comprising: mechanical coupling means capable of maintaining both connections even if one is submitted to its self weight in a direction of separating the other connection when the main body of information processing unit and the file basestation are connected directly by means of the docking connectors of both.

Besides, a seventh information processing unit for attaining the object mentioned above is any one of the second, third and fifth information processing units, further comprising: mechanical coupling means capable of maintaining both connections even if one is submitted to its self weight in a direction of separating the other connection when the main body of information processing unit and the file basestation are connected by means of the docking connectors of both, wherein the mechanical coupling means comprises a coupler provided on the file basestation casing with an engaging portion formed at the tip and freely emergent from the top plate of the file basestation casing and a coupled tool provided on the bottom plate of the main body casing for engaging with the engaging portion of the coupler.

Besides, an eighth information processing unit for attaining the object mentioned above is any one of the second, third, fifth and seventh information processing units, wherein a high-temperature air intake is formed in the front plate of the portreplicator casing.

A ninth information processing unit for attaining the object mentioned above is any one of the above information processing units, wherein the main body has an external power supply connector for accepting an external power and/or a battery, a power switch and power supply control means connected not only to an external power supply connector and/or a battery by means of a power supply line but also to the power switch by means of a signal line.

A tenth information processing unit for attaining the object mentioned above is the ninth information processing unit, wherein the file basestation has an external power supply connector for receiving an external power and the external power supply connector of the file basestation is connected via the first docking connector on the main processing unit side and the docking connector on the file basestation to the power supply control means of the main body by means of the power supply line when the first docking connector on the main processing unit side and the docking connector on the file basestation are connected.

Besides, an eleventh information processing unit for attaining the object mentioned above is any one of the ninth and tenth information processing units, wherein the portreplicator has an external power supply connector for receiving an external power and the external power supply connector of the portreplicator is connected via the second docking connector on the main processing unit side and the docking connector on the portreplicator to the power supply control means of the main body by means of the power supply line when the second docking connector on the main processing unit side and the docking connector on the portreplicator are connected.

A twelfth information processing unit for attaining the object mentioned above is any one of the ninth to eleventh information processing units, wherein the file basestation has a power switch and the power switch of the file basestation is connected via the first docking connector on the main processing unit side and the docking connector on the file basestation to the power supply control means of the main body by means of the signal line when the first docking connector on the main processing unit side and the docking connector on the file basestation are connected.

A thirteenth information processing unit for attaining the object mentioned above is any one of the ninth to twelfth information processing units, wherein the portreplicator has a power switch and the power switch of the portreplicator is connected via the second docking connector on the main processing unit side and the docking connector on the portreplicator to the power supply control means of the main body by means of the signal line when the second docking connector on the main processing unit side and the docking connector on the portreplicator are connected.

A fourteenth information processing unit for attaining the object mentioned above is any one of the above information processing units, comprising: a cylinder lock having an inner cylinder with a key groove formed on one end face, a hook portion fixed on the other end face and an outer cylinder for housing the inner cylinder rotatably for the case of inserting a key in the key groove or unrotatably for the case of inserting no key in the key groove, wherein the outer cylinder has one end face with the one end face of the inner cylinder exposed and the other end face with the hook portion fixed on the other end face of the inner cylinder protruding, and at least one of the main body, the file basestation and the portreplicator has a device which can be housed in its casing but also detached from the casing and whose end face is exposed from the casing, a lock hole is formed on the casing which can be inserted into the casing when the hook portion of the cylinder lock is at a specific angle to the casing and cannot come off unless it becomes at the specific angle to the casing if inserted once, and the lock hole is formed at a position among the surface of the casing where the other end face of the outer cylinder of the cylinder lock is touchable to the end face of the device inserted in the casing when the hook portion of the cylinder lock is inserted into the lock hole.

A fifteenth information processing unit for attaining the object mentioned above is the fourteenth information processing unit, wherein a linkage wire having a linkage portion for being linked to a specified article is attached to the outer cylinder of the cylinder lock.

A sixteenth information processing unit for attaining the object mentioned above is any one of the information processing units, wherein, the main body casing has a top plate with the key face of the keyboard exposed, whose outside surface undergoes an antimicrobial treatment.

The main body of information processing unit for attaining the object mentioned above is a main body of information processing unit with a keyboard, a CPU, a memory, a main body casing for mounting these and a display unit attached to the main body casing, comprising: a first connector on the main processing unit side for receiving/sending a signal and power with a file basestation having a plurality of external storages loaded; and a second docking connector on the main processing unit side for receiving/sending a signal with a portreplicator having a plurality of connectors loaded.

The file basestation for attaining the object mentioned above is a file basestation with a keyboard, a CPU, a memory, a main body casing for mounting these and a display unit attached to the main body casing, comprising: a plurality of external storages;

an external power supply connector for receiving an external power;

a docking connector not only for sending the power received from the external power supply connector to the main body of the information processing unit but also for receiving/sending a signal with the main body of the information processing unit; and a casing not only for housing the external storages but also for mounting the external power supply connector and the docking connector.

Here, the file basestation may have a power switch for starting the file basestation together with the main body of the information processing unit when the main body of the information processing unit and the file basestation are connected via the docking connectors for both.

The portreplicator for attaining the object mentioned above is a portreplicator with a keyboard, a CPU, a memory, a main body casing for mounting these and a display unit attached to the main body casing, comprising:

a plurality of connectors for the signal connection of an external equipment;

an external power supply connector for receiving an external power;

a docking connector not only for sending the power received from the external power supply connector to the main body of the information processing unit but also for receiving/sending a signal with the main body of the information processing unit; and a casing for mounting the connectors, the external power supply connector and the docking connector.

Here, the portreplicator may have a power switch for starting the main body of the information processing unit when the main body of the information processing unit and the above portreplicator are connected via the docking connectors for both.

The information processing unit for attaining another object is an information processing unit comprising a CPU, a storage (primary Hard Disk Drive), a plurality of key switches composing a keyboard, a top plate and a casing for housing the CPU and the external storage from whose top plate the key faces of the key switches are exposed, wherein the top plate of the casing has a portion extending from the exposing parts of the key faces toward the front side of properly operating the keyboard and a part of the extending portion forms a palm rest portion, the external storage is housed below the palm rest portion of the top plate inside the casing and an inorganic antimicrobial agent may be applied to at least the outside surface of the palm rest portion of the top plate.

Here, an inorganic antimicrobial agent may be applied also to the key face of the key switch.

The information processing unit for attaining the other object is an information processing unit comprising a CPU, a plurality of key switches composing a keyboard, a top plate and a casing for housing the CPU from whose top plate the key faces of the key switches are exposed, wherein the CPU is housed below any one of the key switches inside the casing and an inorganic antimicrobial agent may be applied to the key faces of the key switches.

Here, an inorganic antimicrobial agent may be applied also to the outside surface of the top plate of the casing.

Besides, in any one of the above information processing units for attaining the other object, the inorganic antimicrobial agent is preferably an Ag antimicrobial agent.

Besides, in any one of the above information processing units for attaining the other object, the inorganic antimicrobial agent may be an aluminosilicate to which Ag ions are added.

The information processing unit or the information processing related unit for attaining yet another object is an information processing unit or an information processing related unit having a device having one end face and a casing for detachably housing the device with the one end face exposed, comprising: a cylinder lock having an inner cylinder with a key groove formed on one end face, a hook portion fixed on the other end face of the inner cylinder, an outer cylinder for housing the inner cylinder rotatably in the case of inserting a key in the key groove or unrotatably in the case of inserting no key in the key groove, and a linkage wire with one end attached to the outer cylinder and a linkage portion formed at the other end for being linked to a specified article, wherein the conveyance of the casing is restricted, a lock hole is formed on the casing which can be inserted into the casing when the hook portion of the cylinder lock is at a specific angle to the casing and cannot come off as far as it does not become at the specific angle to the casing if inserted once, and the lock hole is formed at a position among the surface of the casing where the other end face of the outer cylinder of the cylinder lock is touchable to the end face of the device inserted in the casing when the hook portion of the cylinder lock is inserted into the lock hole.

BEST MODE FOR CARRYING OUT THE INVENTION

Figure 1:
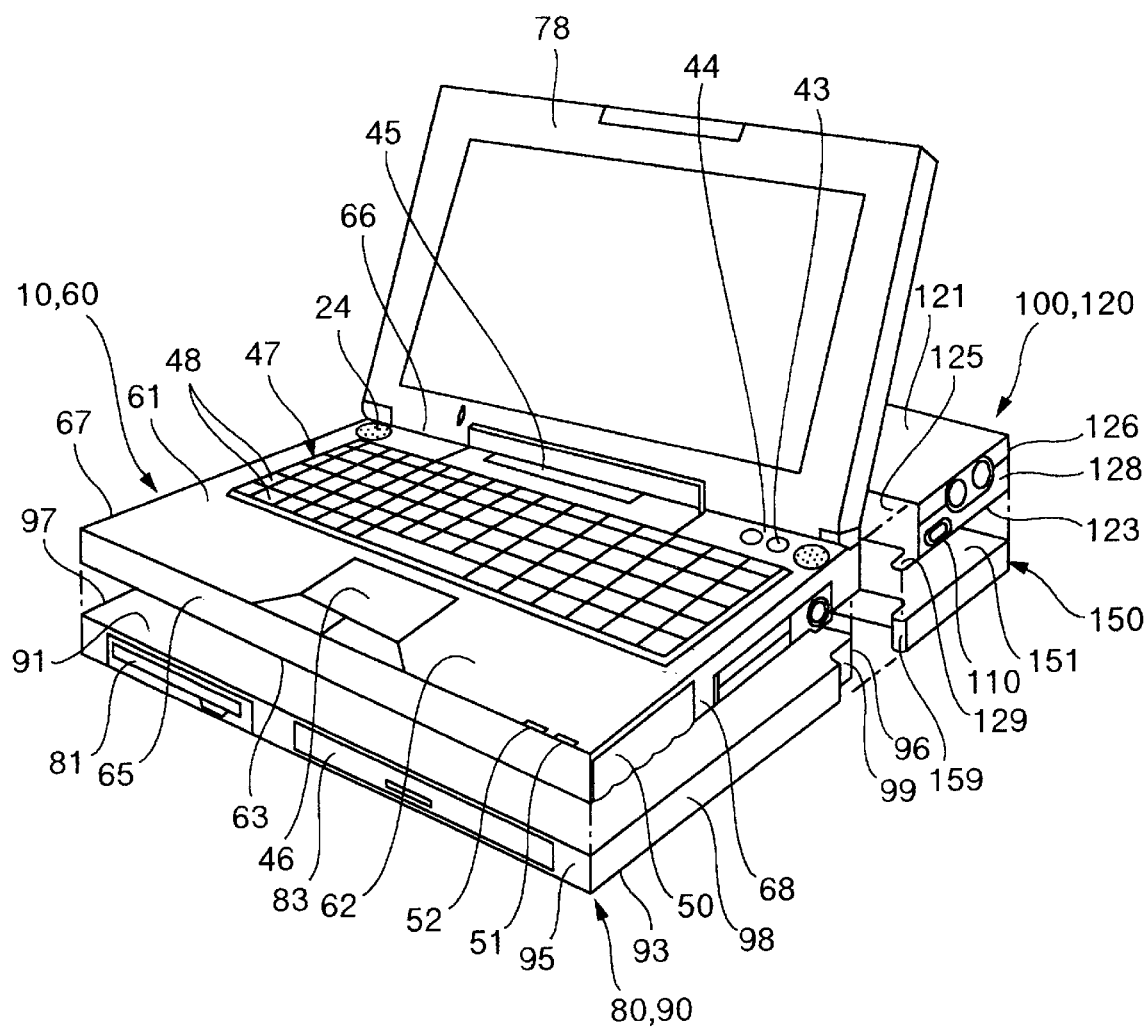
FIG. 1 is a perspective view of an information processing unit according to one embodiment of the present invention at the unconnected state.

Hereinafter, an information processing unit according to one embodiment of the present invention will be described referring to the drawings.

Figure 2:
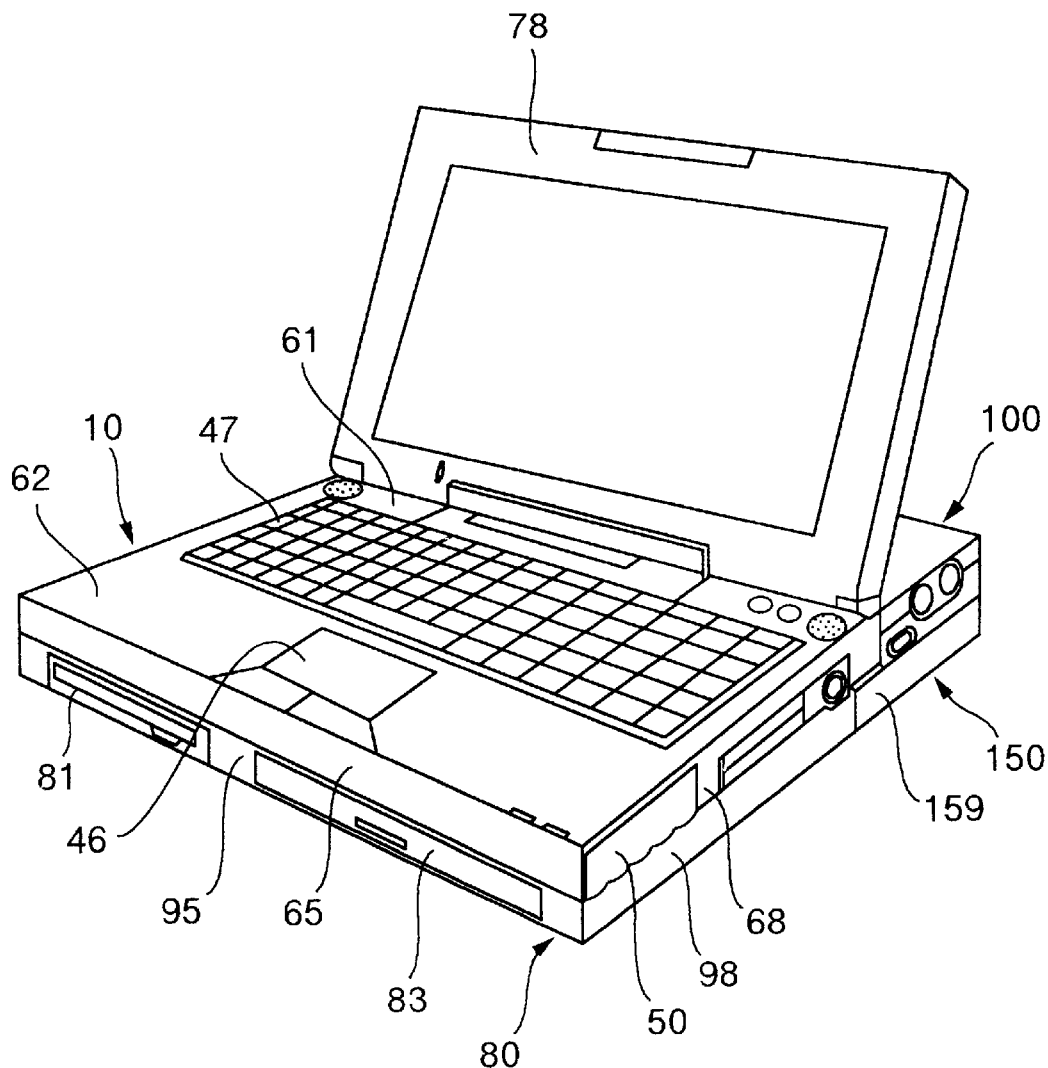
FIG. 2 is a perspective view of an information processing unit according to one embodiment of the present invention at the connected state.

As shown in FIGS. 1 and 2, the information processing unit in this embodiment comprises a portable type main body of information processing unit (hereinafter, referred to simply as main body) 10 called portable computer, book computer or the like, a file basestation 80 having a detachable external storage, a portreplicator 100 having a plurality of connectors for the signal connection to various external equipment and a height adjusting stand 150 for modifying the provision height of this portreplicator 100.

The main body 10 comprises a CPU, a memory, a main body casing 60 for housing these and a display unit 78 having an LCD (Liquid Crystal Display) and attached to the main body casing 60. The file basestation 80 comprises a B/S (file basestation) casing 90 for detachably housing a plurality of external storages. Besides, the portreplicator 100 comprises a P/R (portreplicator) casing 120 with a plurality of connectors and a plurality of ports loaded thereon.

Figure 3:
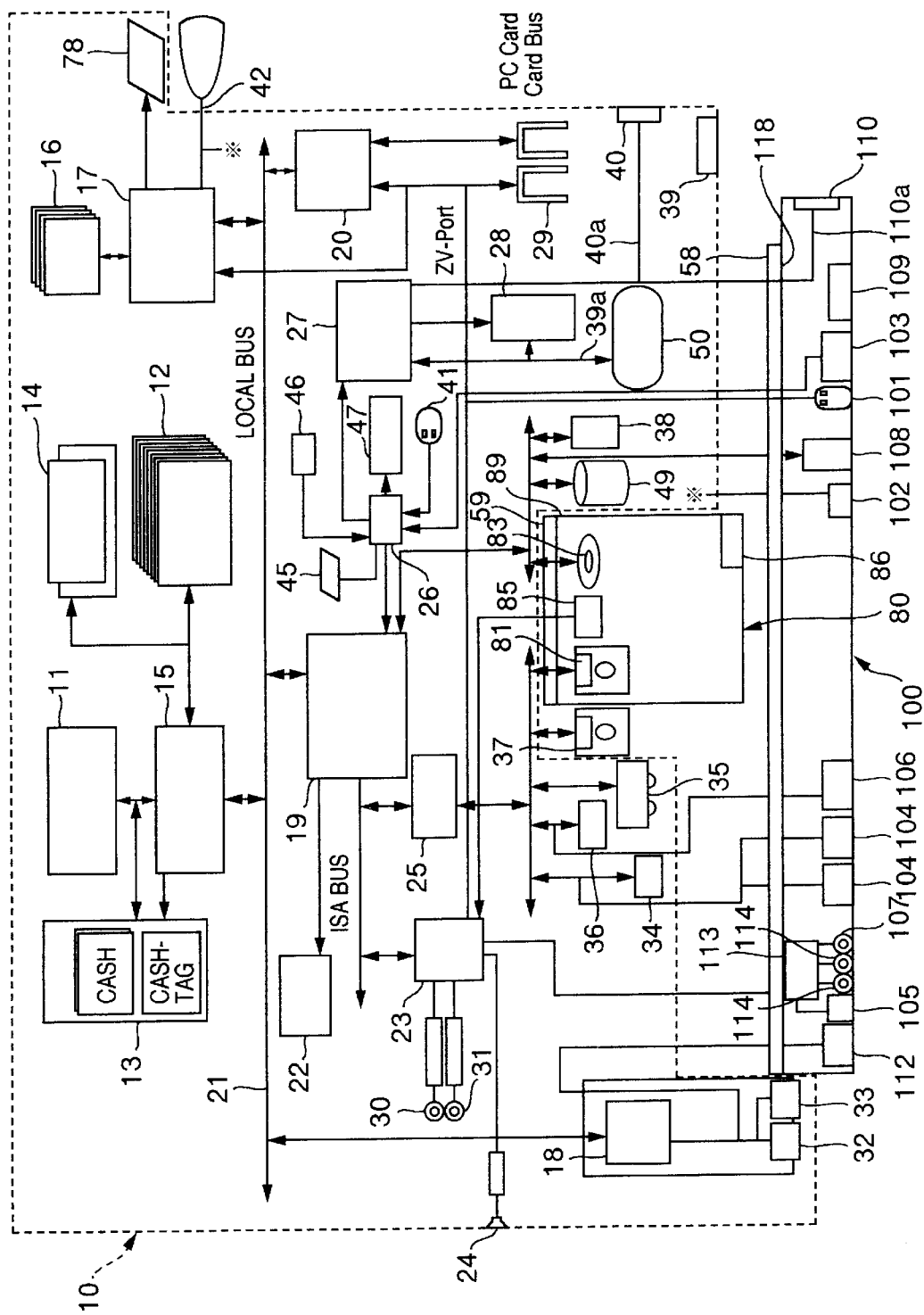
FIG. 3 is a circuit block diagram of an information processing unit according to one embodiment of the present invention.

In addition to the above-mentioned CPU 11, main memory 12, main body casing 60 and the like, as shown in FIG. 3 the main body 10 comprises a cash memory 13, a extended memory 14, a system controller 15, a graphics memory 16, a graphics controller 17, a modem controller 18, an I/O controller 19, a PC card controller 20, a local bus (PCI: Peripheral Component Interconnect) 21 for mutually connecting the above controllers 15, 17, 18, 19 and 20, a BIOS (Basic Input Output System) ROM 22, an audio controller 23, a speaker 24 controlled by this sound source controller 23 to emit a sound, a horn connector 30, a line-in connector 31, a peripheral controller 25, a keyboard 47, a track pad 46, a mouse connector 41 to connect a mouse, a ten key or the like, an indicator 45 for the state display, a keyboard controller 26 for controlling a keyboard 47, a track pad 46, a mouse and the like, a battery 50, a battery controller 27 (power supply control means), an external power supply connector 39, a power switch 40, a power supply control circuit 28 (power supply control means) connected to the battery 50 and the external power supply connector 39 by means of a power supply line 39a and connected to the power switch 40 by means of the signal line 40a via the battery controller 27, a PC card slot 29, a display unit 78 connector 42, a USB (Universal Serial Bus) connector 38, a hard disk drive (hereinafter, abbreviated to HD•D) 49, an external FD•D connection connector 37, an Infrared port 35, a parallel connector 36, a serial connector 34, a cellular connector 33, a modem connector 32, a B/S docking connector 59 on the main processing unit side (first docking connector on the main processing unit side) for the receiving/sending of various signals and the receiving/sending of power from/to the file basestation 80 and a P/R docking connector 58 on the main processing unit side (second docking connector on the main processing unit side) for the receiving/sending of various signals and the receiving/sending of power from/to the portreplicator 100.

Besides, as the above-mentioned external storages, the file basestation 80 has the FD•D 81 and the CD-ROM•D 83, both of which are detachably housed in the B/S casing 90. Furthermore, the file basestation 80 comprises a game port (joy stick port) 85, an external power supply connector 86 and a main body docking connector 89 on the B/S side for receiving/sending of various signals and receiving/sending of power from/to the body 10.

As the various connectors mentioned above, the portreplicator 100 has a modem connector 112, a game port 105, speaker connectors 114 and 114, a microphone connector 107, two serial connectors 104 and 104, a parallel connector 106, a display unit connector 102, a USB connector 108, a mouse connector 101, a keyboard connector 103, an external power supply connector 109 and a main body docking connector 118 on the P/R side for the receiving/sending of various signals from/to the main body 10 and the receiving/sending of power. Furthermore, the portreplicator 100 has a power switch 110 as well.

Figure 4:
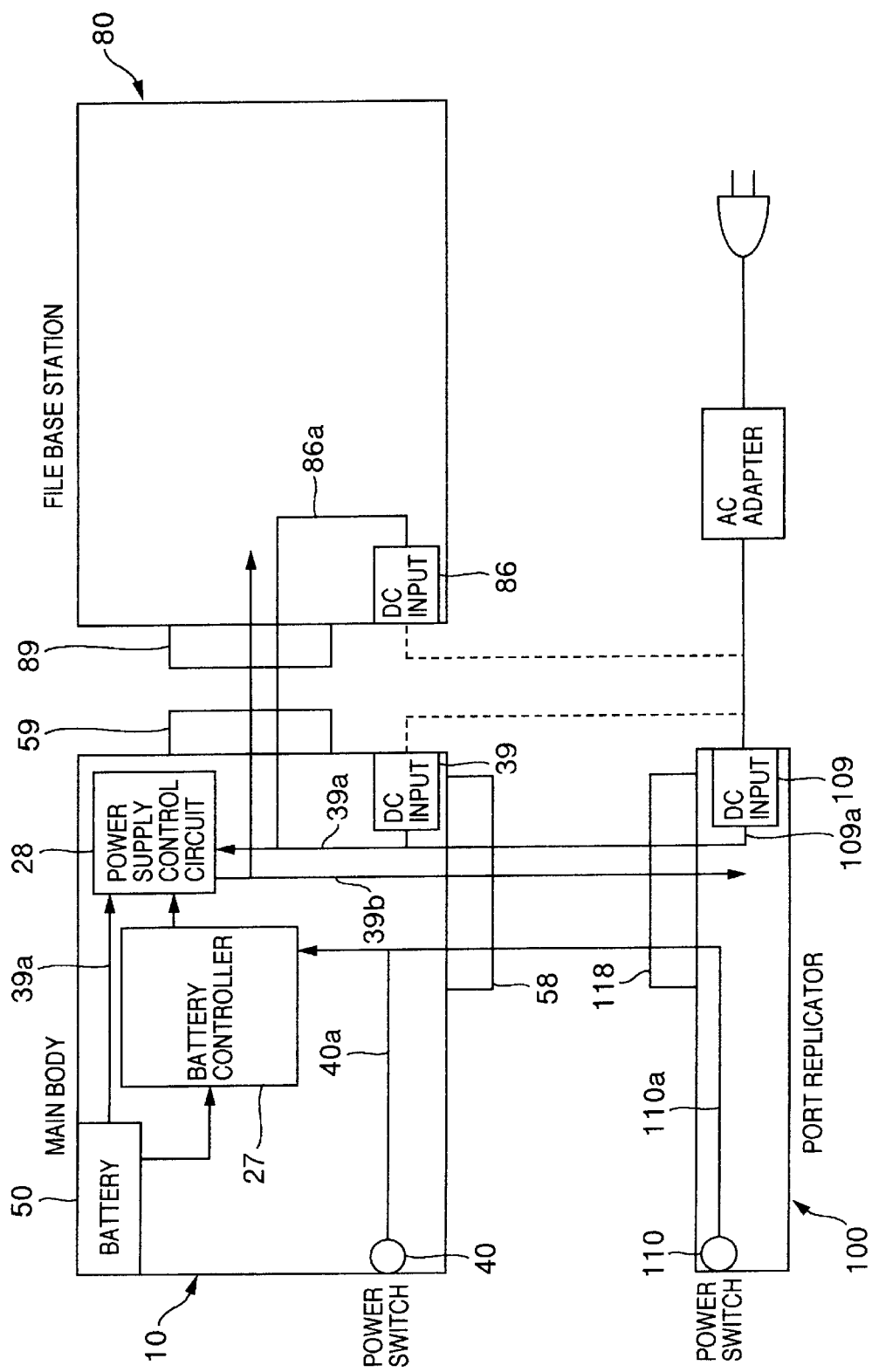
FIG. 4 is a circuit block diagram of a power system of an information processing unit according to one embodiment of the present invention.

Here, the power supply concerns of the main body 10, the file basestation 80 and the portreplicator 100 will be briefly described referring to FIG. 4.

As mentioned above, the main body 10, the file basestation 80 and the portreplicator 100 have their own external power supply connectors 39, 86 and 109, respectively. The external power supply connector 39 of the main body 10 is connected to a power supply control circuit 28 by means of a power supply line 39a. In the case in which the main body docking connector 89 on the B/S side is connected to the B/S docking connector 59 on the main processing unit side (hereinafter, the file basestation 80 and the main body 10 are assumed to be connected), the external power supply connector 86 of the file basestation 80 is electrically connected to the power supply control circuit 28 of the main body 10 via a power supply line 86a in the file basestation 80, a power pin of the main body docking connector 89 on the B/S side, a power pin of the B/S docking connector 59 on the main processing unit side and a power supply line 39a in the main body 10. Besides, in the case in which the main body docking connector 118 on the P/R side is connected to the P/R docking connector 58 on the body (hereinafter, the portreplicator 100 and the main body 10 are assumed to be connected), the external power supply connector 109 of the portreplicator 100 is electrically connected to the power supply control circuit 28 of the main body 10 via a power supply line 109a in the portreplicator 100, a power pin of the main body docking connector 118 on the P/R side, a power pin of the P/R docking connector 58 on the main processing unit side and a power supply line 39a in the main body 10. Namely, when the file basestation 80 and the main body 10 are connected to each other, the external power supplied to the file basestation 80 is basically sent to the power supply control circuit 28 of the main body 10 once. Besides, when the portreplicator 100 and the main body 10 are connected to each other, the external power supplied to the portreplicator 100 is also basically sent to the power supply control circuit 28 of the main body 10 once. After setting the power from an external power source and the power from a battery 50 to a specific voltage, the power supply control circuit 28 sends the power not only to individual equipment, elements or the like of the main body 10 but also to the file basestation 80 and the portreplicator 100 via the power supply line 39b in the main body 10 and power supply pins of individual docking connectors 59, 89, 58 and 118. The power supply control circuit 28 intercepts the transmission to the file basestation 80 if the main body 10 and the file basestation 80 are not connected and intercepts the transmission to the portreplicator 100 if the main body 10 and the portreplicator 100 are not connected.

As mentioned above, the main body 10 and the portreplicator 100 has the power supply switches 40 and 110, respectively. The supply switch 40 of the main body 10 is connected via the battery controller 27 to the power supply control circuit 28 by means of the signal line 40a. If the portreplicator 100 and the main body 10 are connected, the supply switch 110 of the portreplicator 100 is connected via the signal line 110a in the portreplicator 100, the main body docking connector 118 on the P/R side, the P/R docking connector 58 on the main processing unit side, the signal line 40a in the main body 10 and the battery controller 27 to the power supply control circuit 28. In the case in which the main body 10, file basestation 80 and the portreplicator 100 are connected, power is sent from the power supply control circuit 28 to either of them correspondingly and it is started even if any of the power switches 40 and 110 is turned on. For example, when the main body 10 and the file basestation 80 are started to listen to the music or the like recorded in a CD-ROM with the CD-ROM inserted into the CD-ROM•D 83 of the file basestation 80, the power switch 40 of the main body 10 is provided on the top plate 61 of the main body casing 60 (shown in FIG. 5) as described below and this power switch 40 can be manipulated only after the display unit 78 is opened. In contrast to this, the power switch 110 of the portreplicator 100 is provided on the right lateral plate 128 of the P/R casing 120 (shown in FIG. 27) as described below and this power switch 100 can be manipulated even if the display unit remains closed. Like this, by having the power switches 40 and 110 for starting the main body 10 provided on other places than the main body 10, the using convenience of the information processing unit can be improved. Incidentally, the provision of the power switch 40 of the main body 10 on the top face 61 of the main body casing 60 is for the purpose of preventing this power switch 40 from contacting anything to lead to an unexpected start of the main body 10 while it is carried about if the power switch 40 is mounted at a location covered by the display 78. Besides, here, the power switches 40 and 110 are provided on the main body 10 and the portreplicator 100, but a similar power switch may be also provided on the file basestation 80.

Figure 5:
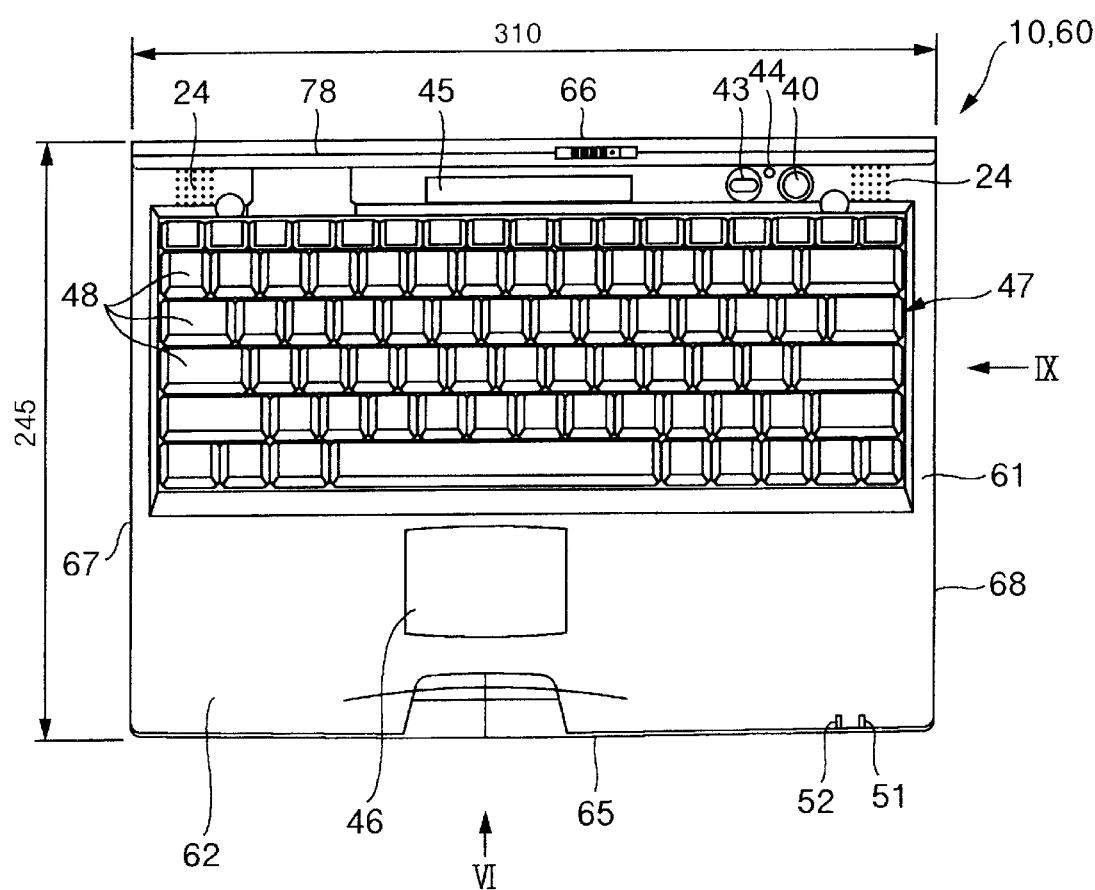
FIG. 5 is a plan view of the main body of an information processing unit according to one embodiment of the present invention (display unit in the open state).
Figure 6:
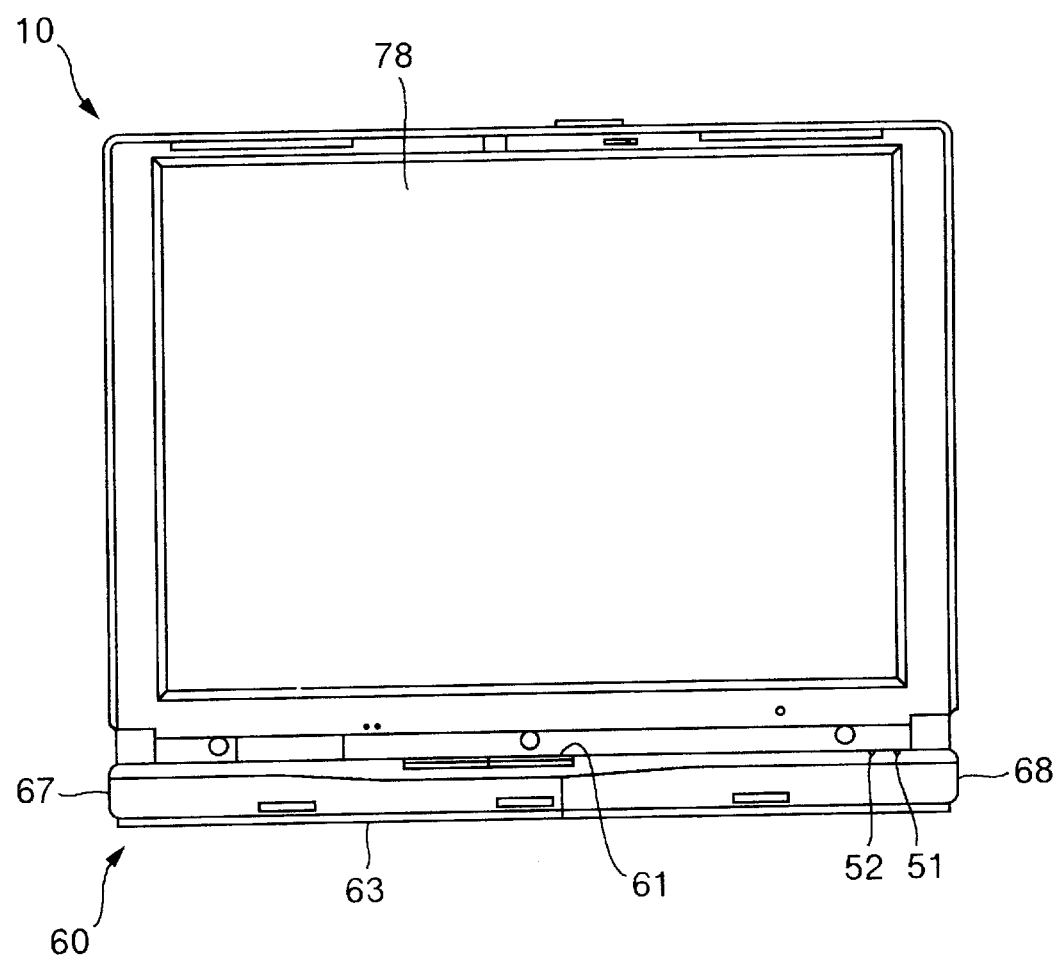
FIG. 6 is a front view of the main body of an information processing unit according to one embodiment of the present invention (IV—arrowed view in FIG. 5).

As shown in FIG. 1 and FIGS. 5–9, the main body casing 60, assuming the shape of a nearly rectangular parallelopiped, has a top plate 61, a bottom plate 63 opposed to the top plate 61, a front plate 65, a back plate 66 opposed to the front plate 65 and both lateral plates 67 and 68 opposed to each other. Near the border between the top plate 61 and the back plate 66 of the main body casing 60, the display unit 78 is oscillatably attached to the main body casing 60. With this embodiment, as shown in FIG. 5, the depth of the main body casing 60, or the mutual spacing between the front plate 65 and the back plate 66, is 245 mm and the width of the main body casing 60, or the mutual spacing between both the lateral plates 67 and 68, is 310 mm. On the back-plate side of the top plate 61, a speaker 24 and an indicator 45, a suspended ridium 43, a cover down switch 44 for moving to the power saving mode for the display unit 78 on closing the display unit 78 and a power switch 40 are provided. The front-plate side of the top plate 61 forms a palm rest portion 62 on which to rest hands when manipulating the keyboard 47 and a track pad 46 is provided at the center of this palm rest port 62. From the top plate 61 between the speaker 24 or the like and the palm rest portion 62, the key faces of a plurality of key switches 48, 48, . . . composing the keyboard 47 are exposed. At the border between the top plate 61 and the front plate 65, a power lamp 51 indicating that the main body 10 is Power ON and a charge lamp 52 indicating that the battery 50 is charging are provided as shown in FIGS. 5 and 6. Onto the outer surface of the palm rest portion 62 of the top plate 61 and the key faces of the key switches 48, an added paint of Ag ions to an aluminosilicate is applied. The added ones of Ag ions to an aluminosilicate act as antimicrobial agents excellent in durability and heat resistance.

Figure 7:
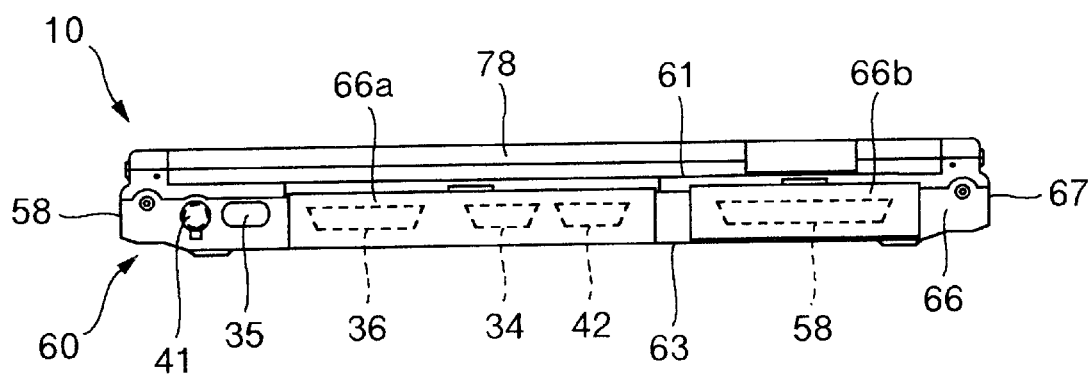
FIG. 7 is a rear view of the main body of an information processing unit according to one embodiment of the present invention (display unit in the close state).
Figure 12:
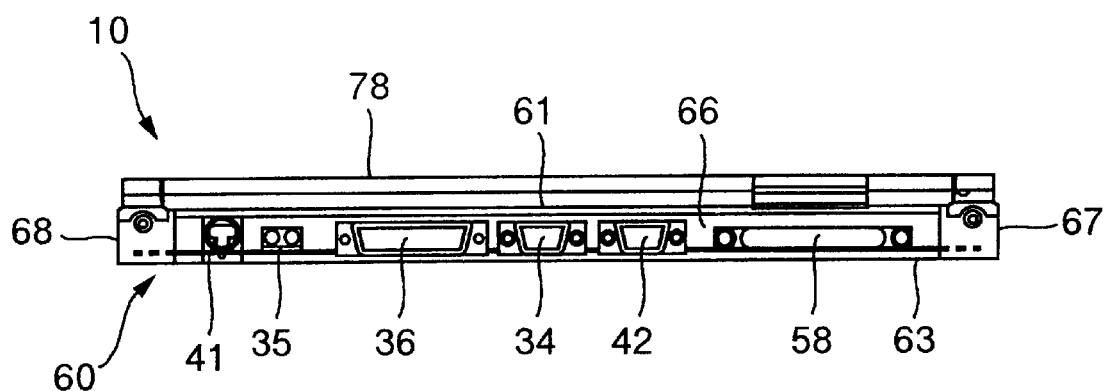
FIG. 12 is a rear arrangement illustration of the main body of an information processing unit according to one embodiment of the present invention.

On the back plate 66 of the main body casing 60, a mouse connector 41, an infrared port 35, a parallel connector 36, a serial connector 34, a display unit connector 42 and a P/R docking connector on the main processing unit side 58 are provided as shown in FIGS. 7 and 12. For the parallel connector 36, the serial connector 34 and the display unit connector 42, a cover 66a for blocking these when unused is provided (FIG. 7). Besides, for the P/R docking connector 58 on the main processing unit side 58, a cover 66b for blocking this when unused is provided (FIG. 7).

Figure 8:
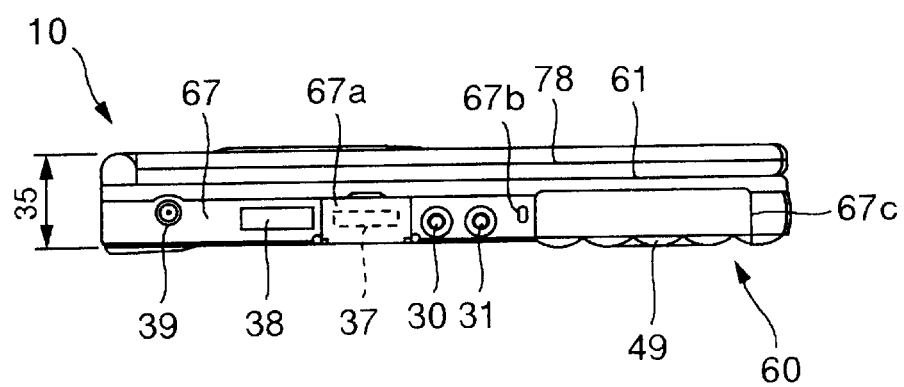
FIG. 8 is a left side view of the main body of an information processing unit according to one embodiment of the present invention (display unit in the close state).
Figure 10:
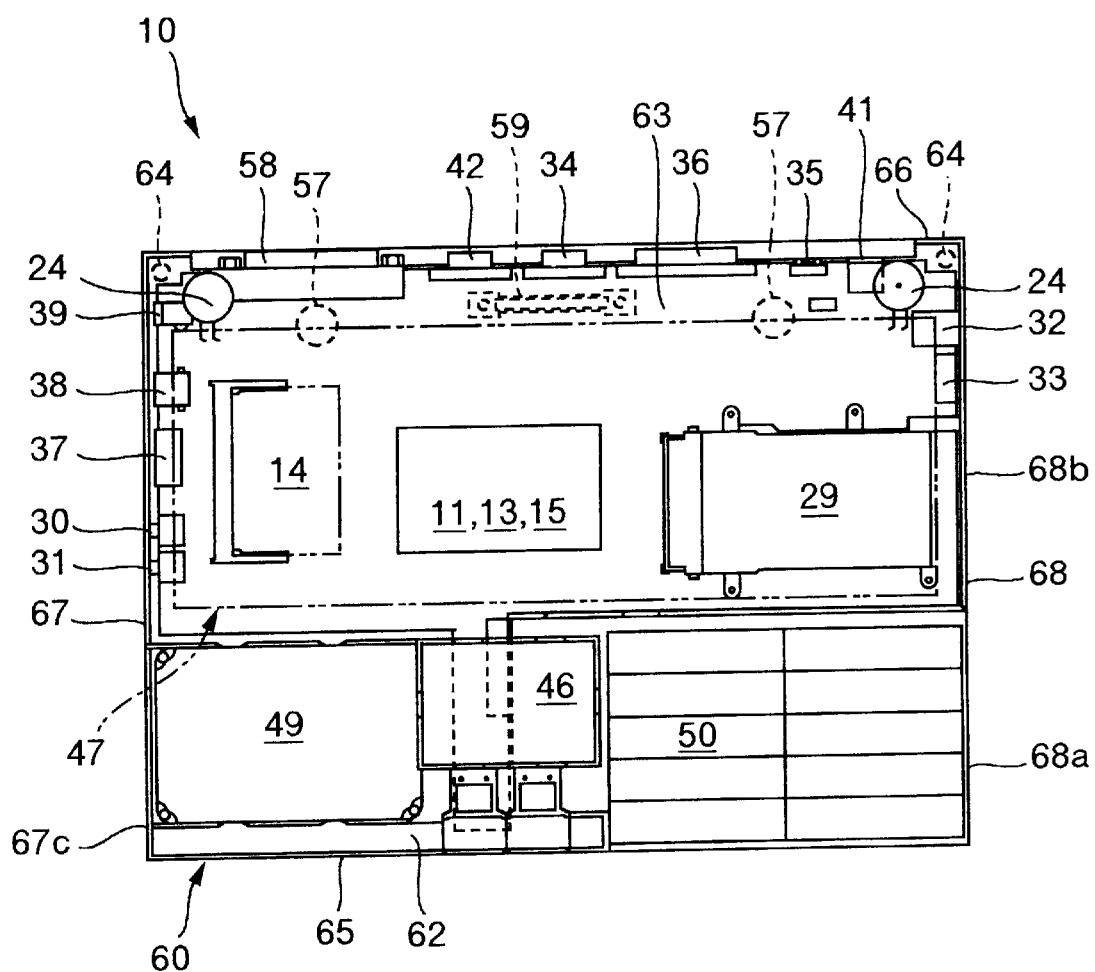
FIG. 10 is a plan arrangement illustration of the main body of an information processing unit according to one embodiment of the present invention.
Figure 11:
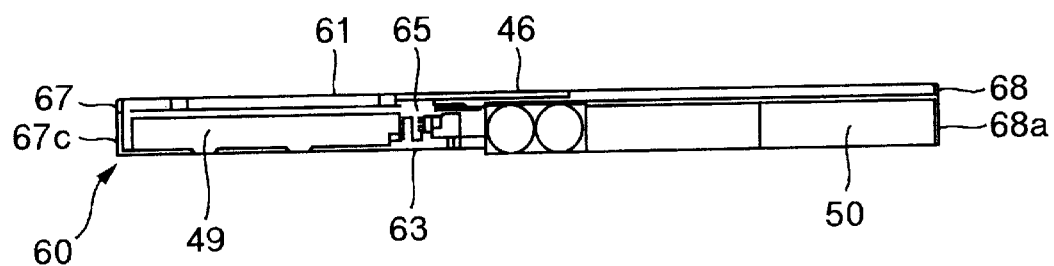
FIG. 11 is a front arrangement illustration of the main body of an information processing unit according to one embodiment of the present invention.
Figure 13:
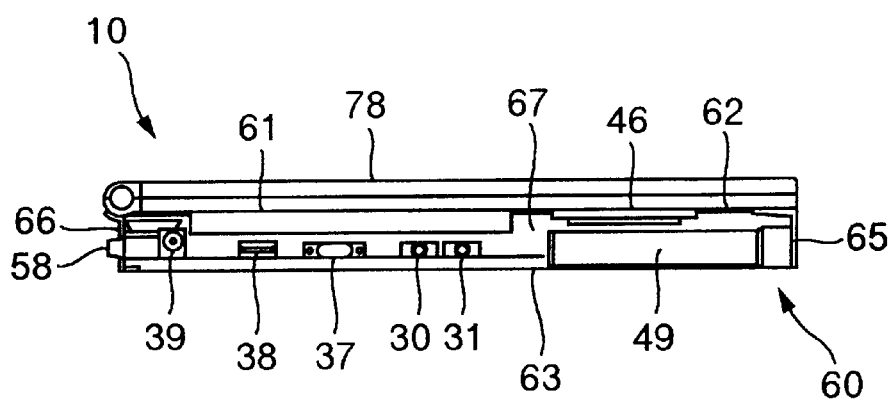
FIG. 13 is a left side arrangement illustration of the main body of an information processing unit according to one embodiment of the present invention.
Figure 35:
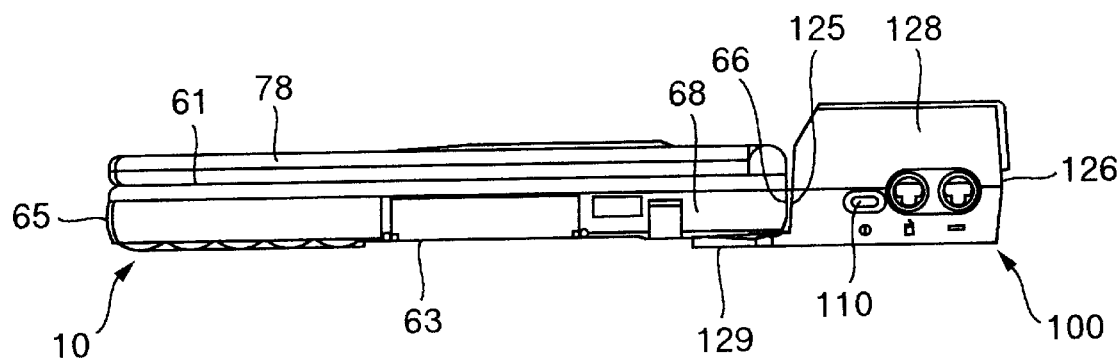
FIG. 35 is a right side view of a portreplicator according to one embodiment of the present invention, connected to the main body of the information processing unit.

On the left lateral plate 67 of the main body plate 60, an external power supply connector 39, a USB connector 38, an external FD•D connecting connector 37, a horn connector 30, a line-in connector 31, a lock hole 67b of the cylinder lock described later and an HD•D insert port 67c are provided as shown in FIGS. 8 and 13. For the external FD•D connecting connector 37, a cover 67a for blocking this 66b when unused is provided (FIG. 8). On the right lateral plate 68 of the main body casing 60, a battery insert port 68a, a PC card insert port 68b, a cellular connector 33 and a modem connector 32 are provided Beneath the key board 47, a CPU board for mounting a CPU 11, a cash memory 13 and a system controller 15, an extended memory 14 and PC card slots 29 are provided as shown in FIG. 10. Like this, by having a CPU port or an extended memory 14 provided beneath the key board 47, the assembling efficiency at the manufacturing can be raised and moreover an ease of memory expansion by a user can be enhanced. This is because the CPU board is exposed directly after removing the keyboard 47 from the top plate 61 of the casing 60. Into the PC card slot 29, a PC card can be inserted through the PC card insert port 68b of the left lateral plate 67. On the left lateral plate below the palm rest portion 62 of the top plate 61, a HD•D 49 is provided and this HD•D 49 can be put through the HD•D insert port 67c of the left lateral plate 67 into/out of the main body casing 60. On the right lateral plate below the palm rest portion 62 of the top plate 61, a battery 50 is provided and this battery 50 can be put through the battery insert port 68a into/out of the main body casing 60. On the bottom plate 63 of the main body casing 60, a B/S docking connector 59 on the main processing unit side, a linked nut 57 (linked tool) for a sufficiently strong linkage at the time of linkage to the file basestation 80 and a pin hole 64 to put the connection aid pin 141 (shown in FIG. 35) described above are provided.

In recent years, onto a direct touch portion of human hands, such as door knob, an organic antimicrobial agent is often applied. Accordingly, also with computers, it is sufficiently thinkable that an antimicrobial agent is applied to key faces or the palm rest portion, touched by human hands. As with this embodiment, however, if there is a CPU 11 subject to heating below key switches 48 or there is an HD•D 49 subject to heating below the palm rest portion 62, no antimicrobial efficacy is expectable for organic antimicrobial agents because of a low heat resistance. Thus, with this embodiment, an inorganic antimicrobial agent high in heat resistance is applied to key faces or the palm rest portion 62 in consideration of heating in the CPU 11 or the HD•D 49. Especially, with this embodiment, since an added inorganic antimicrobial agent of Ag ions to an aluminosilicate is used as mentioned above, its heat resistance is very high and it withstands as high temperature as about 500° C. and further can be used even if mixed into the resin forming a main body casing 60 or key switches 48 at molding. Besides, this added inorganic antimicrobial agent of Ag ions to an aluminosilicate is very high also in the antimicrobial efficacy to various bacilli such as *Escherichia coli,* Salmonella and *Staphylococcus aureus.*

Figure 14:
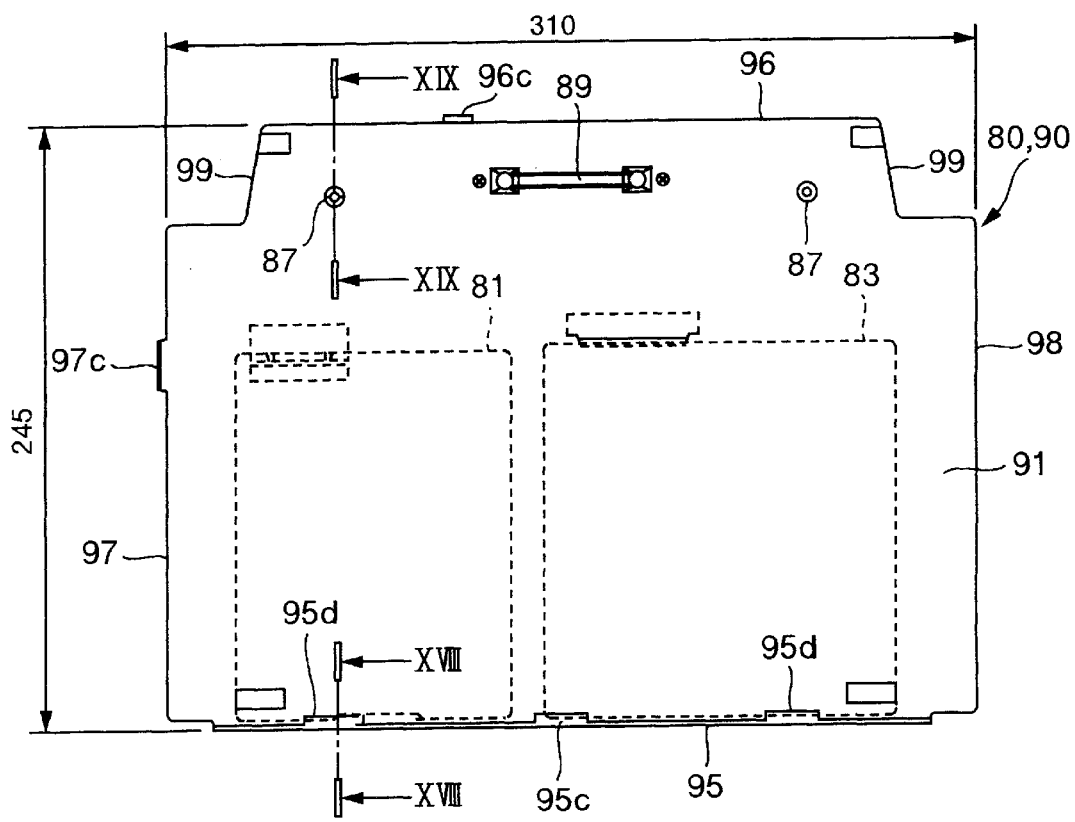
FIG. 14 is a plan view of a file basestation according to one embodiment of the present invention.

As shown in FIG. 1 and FIGS. 14–17, the B/S casing 90, assuming a nearly rectangular parallelopiped, has a top plate 91, a bottom plate 93 opposed to the top plate 91, a front plate 95, a back plate 96 opposed to the front plate 95 and both lateral plates 97 and 98 opposed to each other. Both lateral plate sides of the back plate 66 cave in toward the front-plate side and these form recess 99. With this embodiment, as shown in FIG. 14 the depth of the B/S casing 90, or the mutual spacing between the front plate 95 and the back plate 96, is 245 mm, equal to the mutual spacing between the front plate 65 and the back plate 66 of the main body casing 60, the width of the B/S casing 90 or the mutual spacing between both the lateral plates 97 and 98, is 310 mm, equal to the mutual spacing between both the lateral plates 67 and 68 of the main body casing 60. On the top plate 91 of the B/S casing 90, a main body docking connector 89 on the B/S side and a linkage bolt 87 are provided. The main body docking connector 89 on the B/S side and linkage bolt 87 are provided in the position in which main body docking connector 89 on the B/S side of the file basestation 80 is connected to the B/S docking connector 59 on the main processing unit side of the body 10 and the liking bolt 87 of the file basestation 80 can be screwed into the liked nut 57 of the main body 10 when the bottom plate 63 of the main body casing 60 is placed on the top plate 91 of the B/S casing 90 and the front/back plates 95 and 96 and both lateral plates 97 and 98 of the B/S casing 90 are made coincident with the front/back plates 65 and 66 and both lateral plates 67 and 68 of the main body casing 60.

Figure 15:
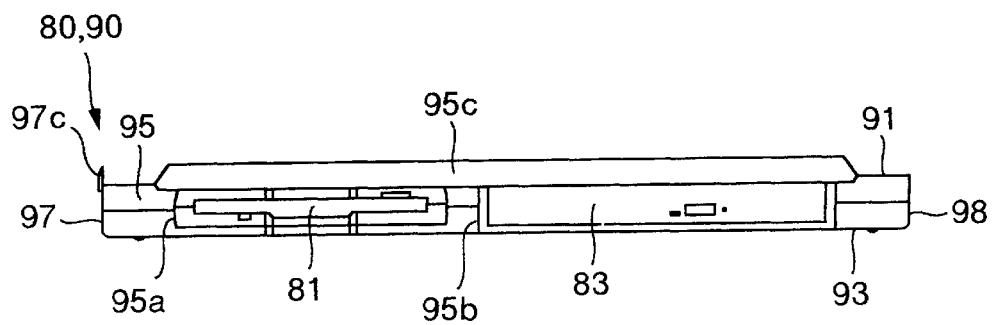
FIG. 15 is a front view of a file basestation according to one embodiment of the present invention.
Figure 45:
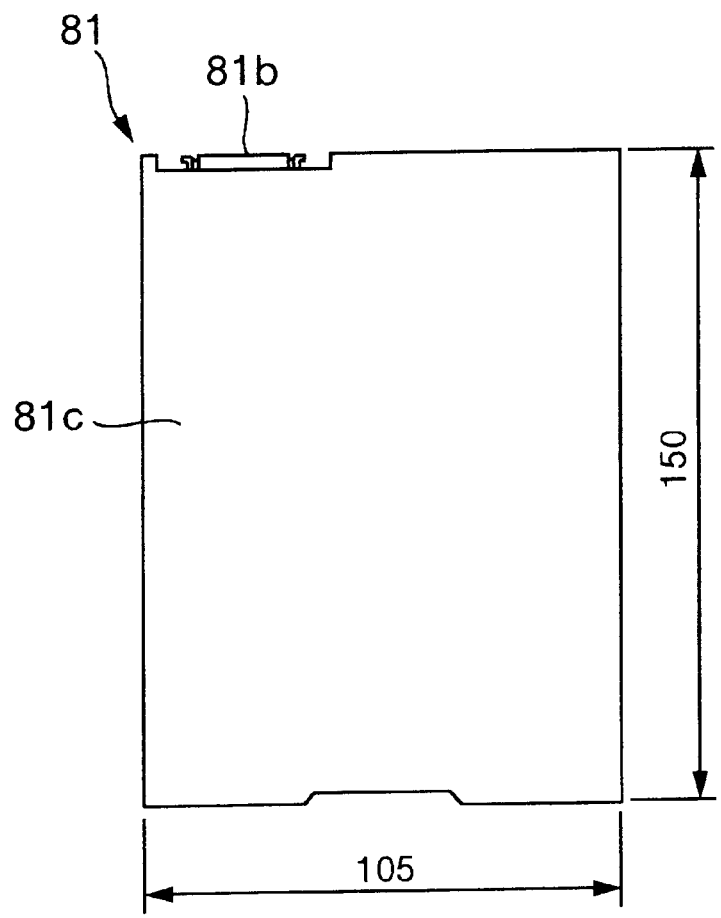
FIG. 45 is a plan view of a cased FD•D according to one embodiment of the present invention.
Figure 46:
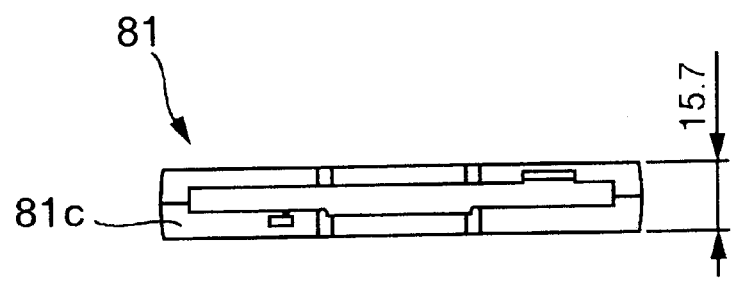
FIG. 46 is a front view of a cased FD•D according to one embodiment of the present invention.
Figure 47:
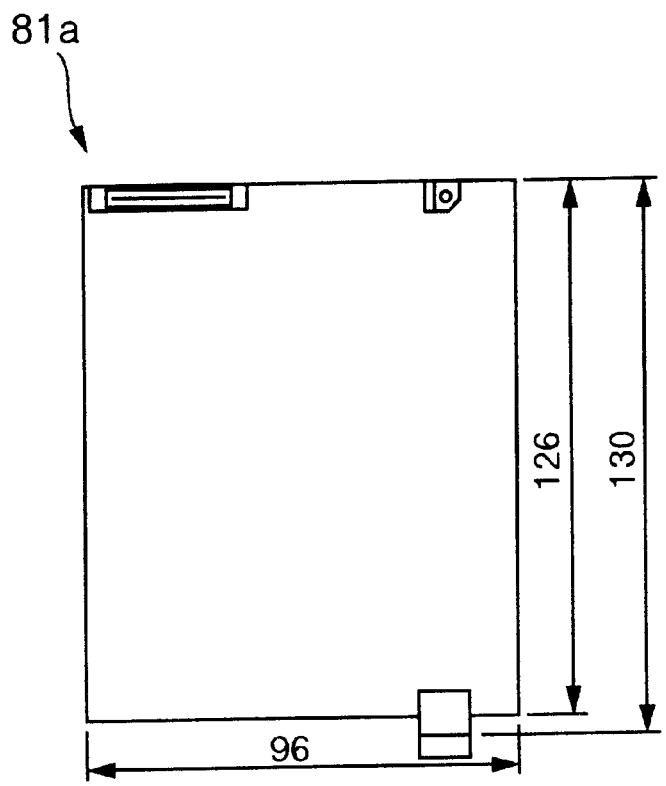
FIG. 47 is a plan view of an uncased FD•D according to one embodiment of the present invention.
Figure 48:
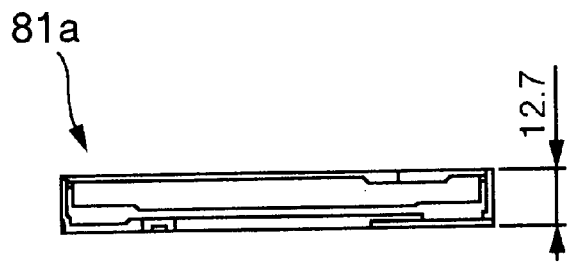
FIG. 48 is a front view of an uncased FD•D according to one embodiment of the present invention.
Figure 49:
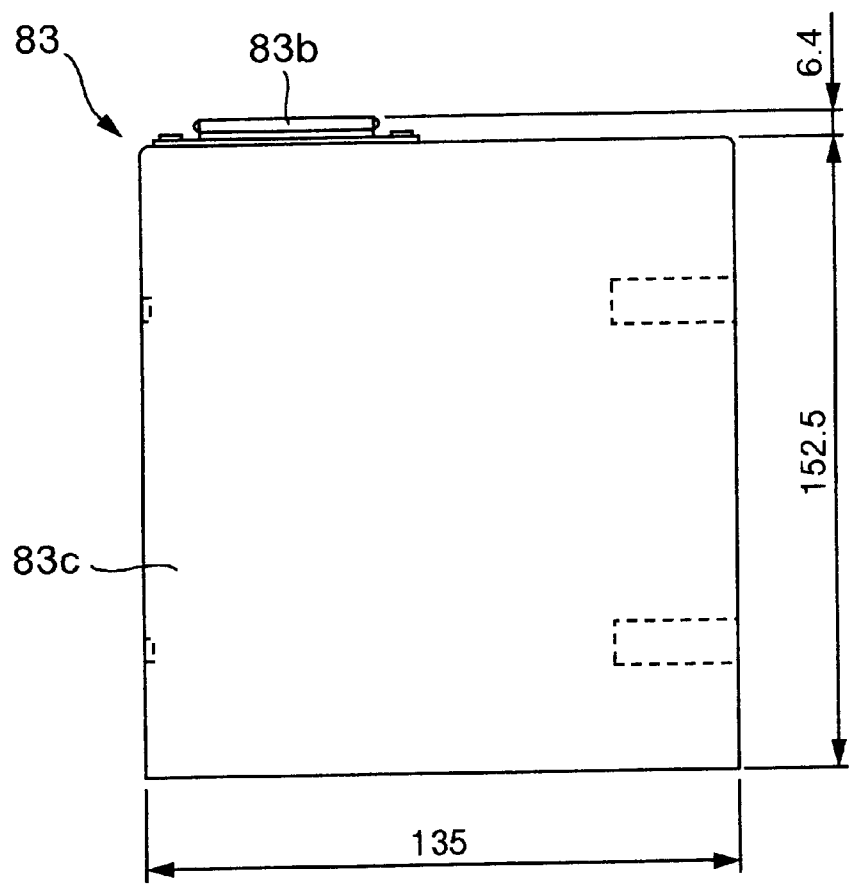
FIG. 49 is a plan view of a cased CD-ROM•D according to one embodiment of the present invention.
Figure 50:
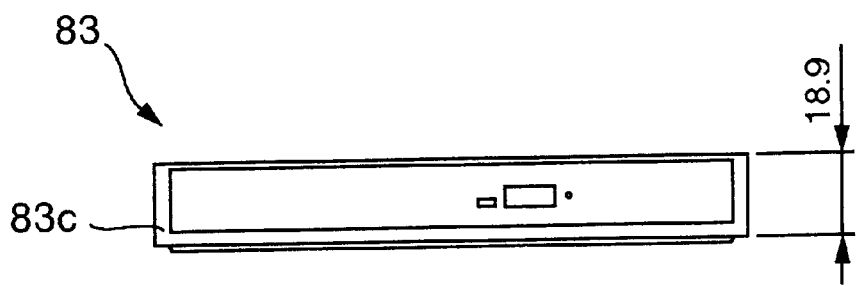
FIG. 50 is a front view of a cased CD-ROM•D according to one embodiment of the present invention.
Figure 51:
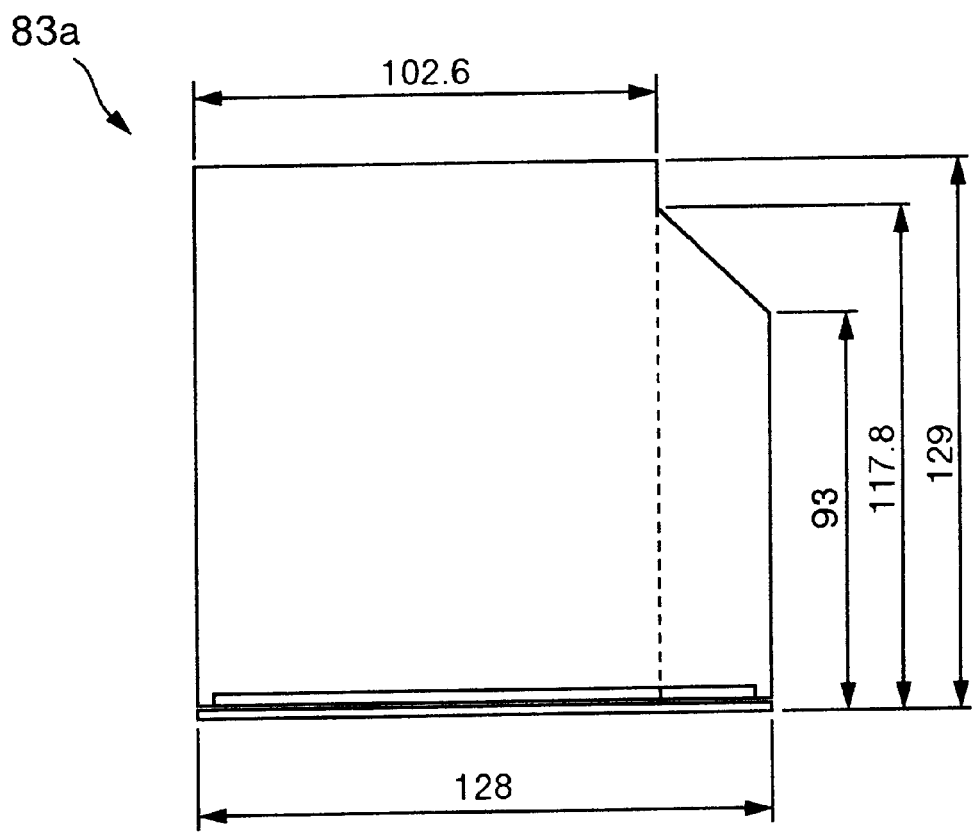
FIG. 51 is a plan view of an uncased CD-ROM•D according to one embodiment of the present invention.
Figure 52:
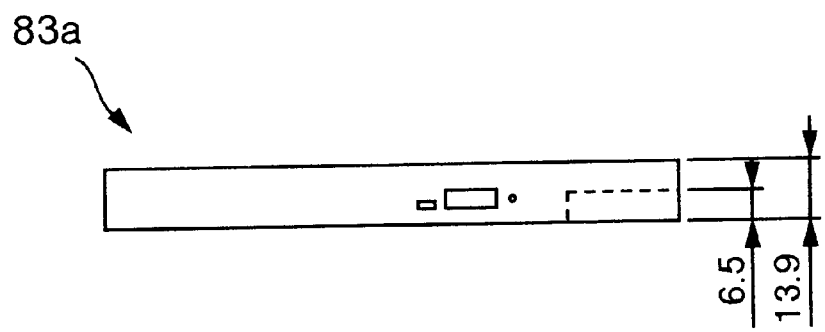
FIG. 52 is a front view of an uncased CD-ROM•D according to one embodiment of the present invention.

On the front plate 95 of the B/S casing 90, an FD•D insert port 95a and a CD-ROM•D insert port 95b are provided as shown in FIG. 15 and the FD•D 81 and the CD-ROM•D 83 can be put respectively through the insert ports 95a and 95b into/out of the B/S casing 90 as shown in FIG. 15. In this embodiment, because of the premise that they can be put into/out of the B/S casing 90 as mentioned above, the FD•D 81 and the CD-ROM•D 83 are cased and are put into/out of the B/S casing 90 with individual cases. As shown in FIGS. 47 and 48, the dimensions of a FD•D 81a without the case are 96 mm in width and 126 mm in depth, while those 81 of an FD•D 81a put in case 81c are 105 mm in width and 150 mm in depth as shown in FIGS. 45 and 46. Besides, as shown in FIGS. 51 and 52, the dimensions of a CD-ROM•D 83a without the case are 128 mm in maximum width and 129 mm in depth, while those 83 of a CD-ROM•D 83a put in case 83c are 135 mm in width and 152.2 mm in depth as shown in FIGS. 49 and 50. In individual cases 81c and 83c of an FD•D 81 and a CD-ROM•D 83, the respective connectors 81b and 83b for receiving/sending a signal are provided.

Figure 17:
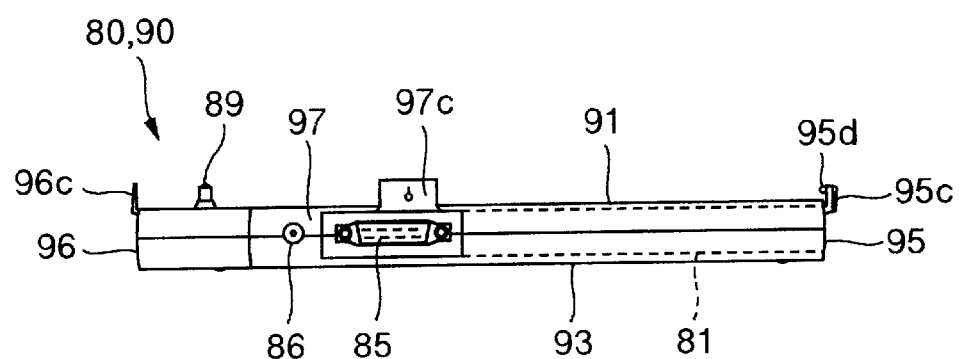
FIG. 17 is a left side view of a file basestation according to one embodiment of the present invention.

On the left lateral plate 97 of the B/S casing 90, an external power supply connector 86 and a game port 85 are provided as shown in FIG. 17.

Figure 16:
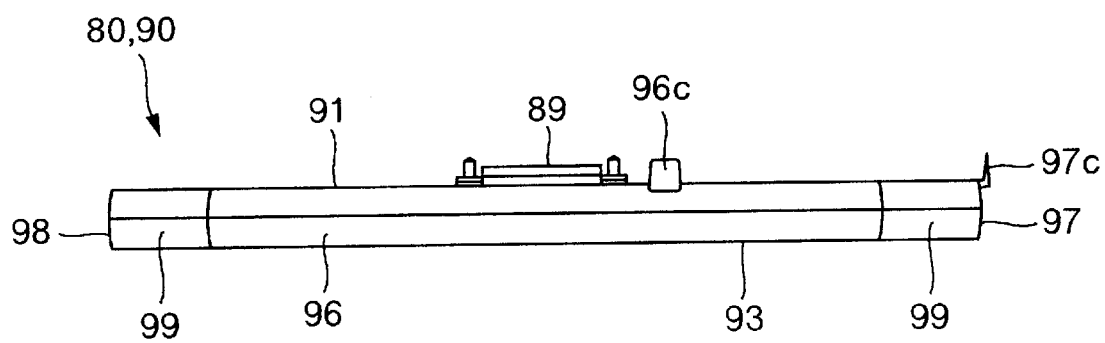
FIG. 16 is a rear view of a file basestation according to one embodiment of the present invention.
Figure 18:
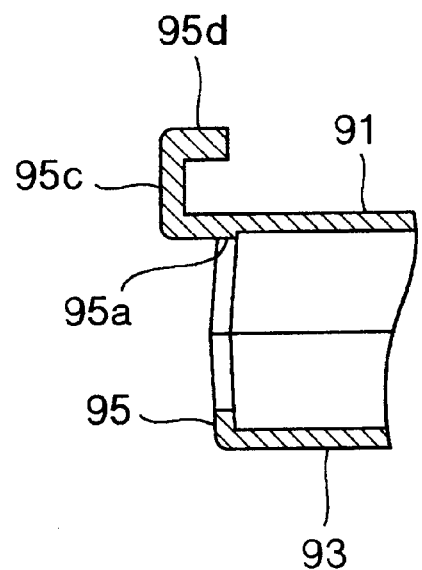
FIG. 18 is a sectional view taken along the line XVIII—XVIII of FIG. 14.

At the border of the front plate 95 with the top plate 91, a front plate positioning member 95c is provided as shown in FIGS. 14 and 15, at the border of the back plate 96 with the top plate 91, a back plate positioning member 96c is provided as shown in FIGS. 14 and 16 and at the border of the left lateral plate 97 with the top plate 91, a left lateral plate positioning member 97c (connector connection regulating member) is provided as shown in FIGS. 14 and 17. All of these positioning members 95c, 96c and 97c extend vertically upward to the top plate 61 and serve to position the main body 10 to the file basestation 80 by coming into contact with the front plate 65, the back plate 66 and the left lateral plate 67 of the main body casing 60 when connecting the main body 10. Especially, the front-plate positioning member 95c extends to the back-plate side in parallel to the top plate 61 after vertically extending upward to the top plate 61 as shown in FIG. 18 and this portion 95d or hanged portion 95d is hanged on the front plate 65 of the main body casing 60 when connecting the main body 10 to the file basestation 80 to retain the ordinary connecting strength together with the docking connectors 59 and 89.

Figure 19:
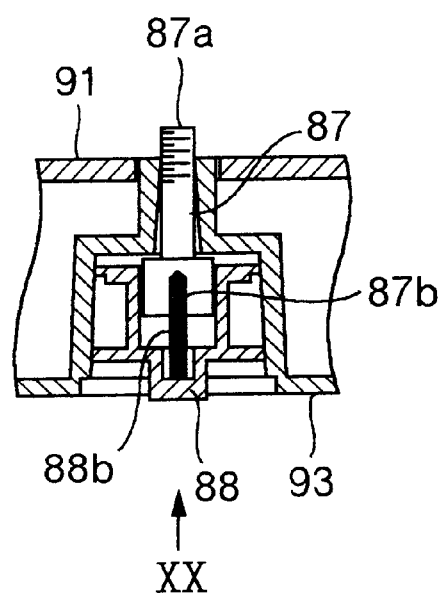
FIG. 19 is a sectional view taken along the line XIX—XIX of FIG. 14.
Figure 20:
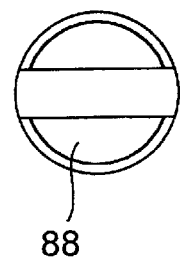
FIG. 20 is a XX—arrowed view of FIG. 19.

As shown in FIGS. 19 and 20, a linking knob 88 is provided on the bolt head 87b of the linking bolt 87 mentioned above. In conjunction with the linking knob 88, the linking bolt 87 is provided so as to be unrotatable around the axis of the linking bolt 87 and as to be relatively movable in the axial direction of the linking bolt 87. The linking knob 88 is exposed from the bottom plate 93 of the B/S casing 90 and is provided so as to be unmovable to this bottom plate 93 and relatively rotatable. Between the bolt head 87b of the linking bolt 87 and the linking knob 88, a coil spring 88b is disposed. In an unconnected state of the main body 10 and the file basestation 80, the screw portion 87a (engaging portion) of the linking bolt 87 protrudes vertically upward from the top plate 91 of the B/S casing 90. In this state, when any article falls into contact with it, the screw portion 87a of the linking bolt 87 is embedded in the B/S casing 90. Thus, in a simply connected state of the main body 10 and the file basestation 80, in other words, in a simply connected state of the B/S docking connector 59 on the main processing unit side and the main body docking connector 89 on the B/S side, the tip of the linking bolt 87 falls into contact with the end face of the above linked nut 57 (linked tool) of the main body 10 and the screw portion 87a of the linking bolt 87 is embedded in the B/S casing 90. From this state, when the linking bolt 87 is rotated by rotating the linking knob 88 exposed from the bottom plate 93 of the B/S casing 90, the screw portion 87a of the linking bolt 87 comes to protrude from the top plate 61 while rotated and is gradually embedded into the linked nut 57 of the main body 10. Like this, by having the linking bolt 87 and the linking knob 88, composing components of mechanical linking means, provided on the file basestation side, as well as the linked nut 57 composing a component of mechanical linking means provided on the main processing unit side, the connecting strength of the main body 10 to the file basestation 80 can be raised. Incidentally, the connecting strength of the linked nut 57 of the main body 10 to the liking bolt 87 of the file basestation 80 is as strong as capable of retaining the connection of both of them 10 and 80 even if such a heavier weight than the self weight is imposed on either of them as to disconnect the other. Thus, by using the connection by this mechanical linking means when conveying the file basestation 80 together with the main body 10, in addition to the connection by the docking connectors 59 and 89 of both of them 10 and 80 and the connection by the front-plate positioning member 95c of the file basestation 80, the file basestation 80 is not shaken to the main body 10, thus enabling damages to the docking connectors 59 and 89 of both to be prevented.

Figure 21:
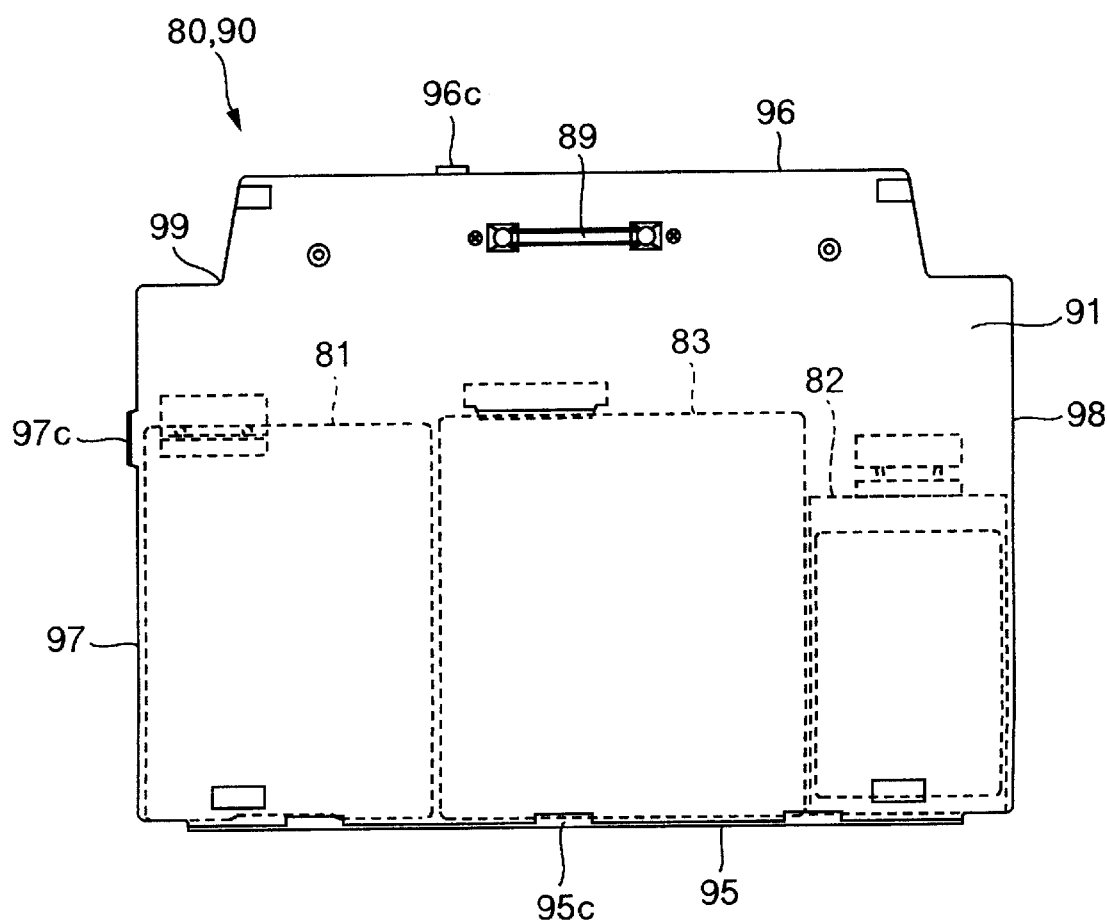
FIG. 21 is a plan view of a file basestation according to another embodiment of the present invention.
Figure 22:
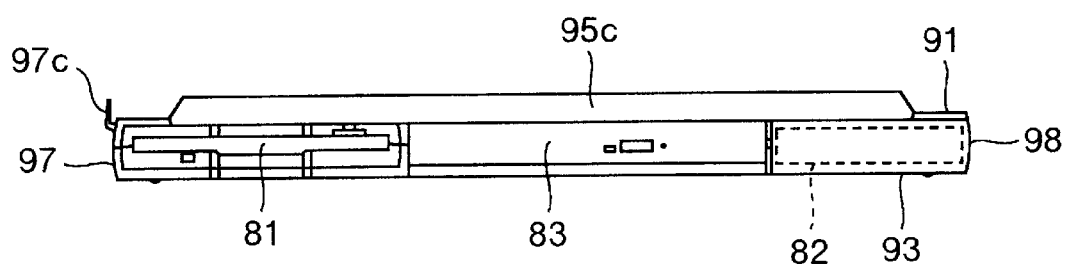
FIG. 22 is a front view of a file basestation according to another embodiment of the present invention.
Figure 23:
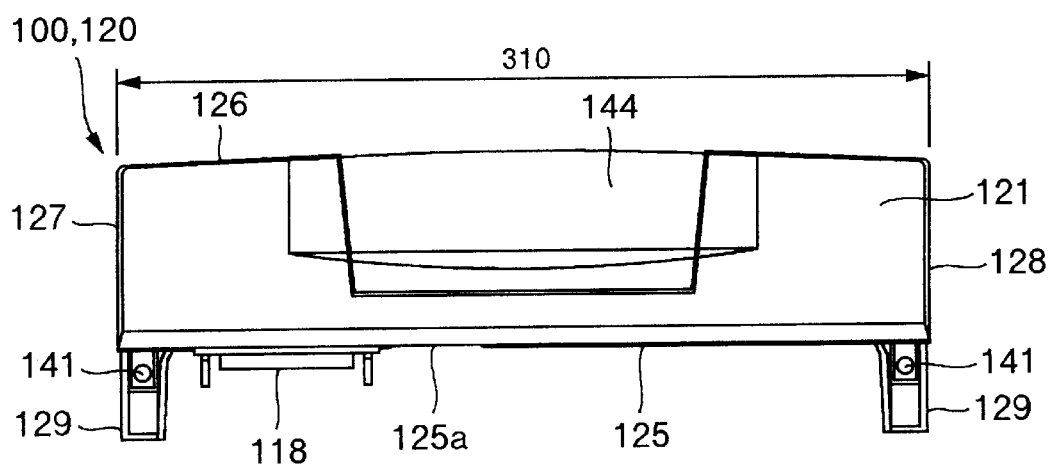
FIG. 23 is a plan view of a portreplicator according to one embodiment of the present invention.
Figure 53:
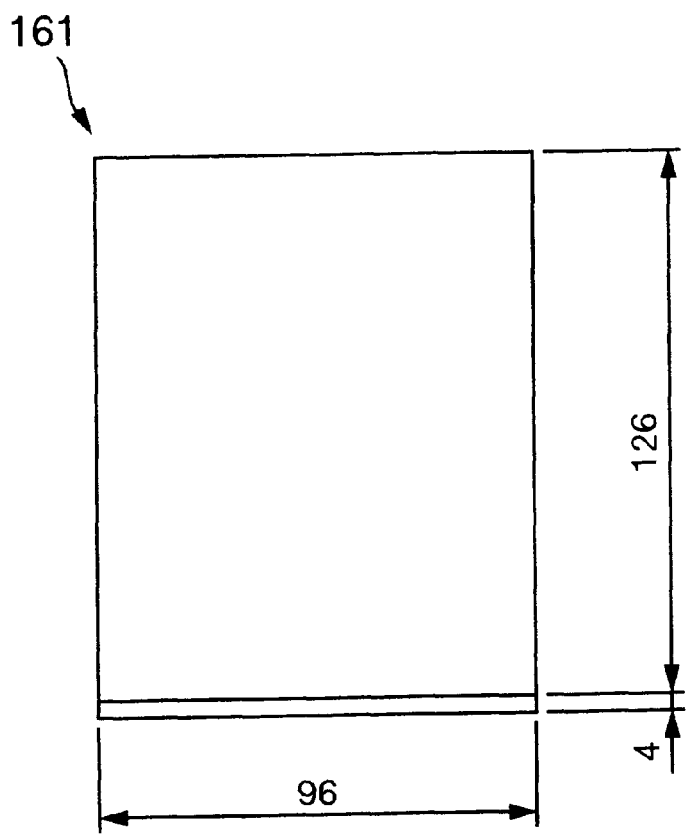
FIG. 53 is a plan view of an LS-120•D according to one embodiment of the present invention.
Figure 54:
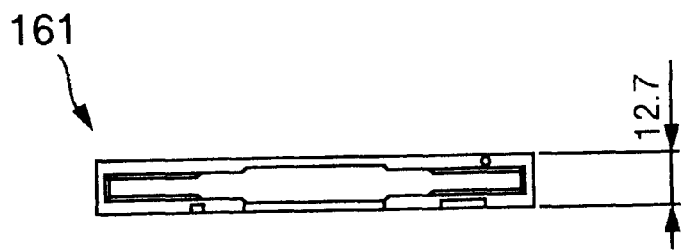
FIG. 54 is a front view of an LS-120•D according to one embodiment of the present invention.
Figure 55:
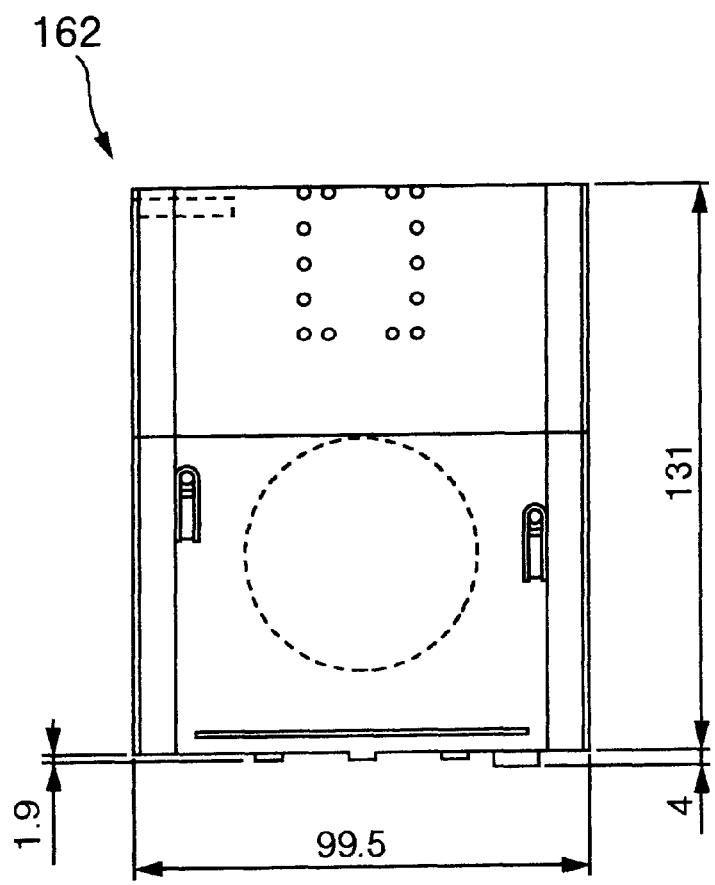
FIG. 55 is a plan view of a ZIP•D according to one embodiment of the present invention.
Figure 56:
FIG. 56 is a front view of a ZIP•D according to one embodiment of the present invention.
Figure 57:
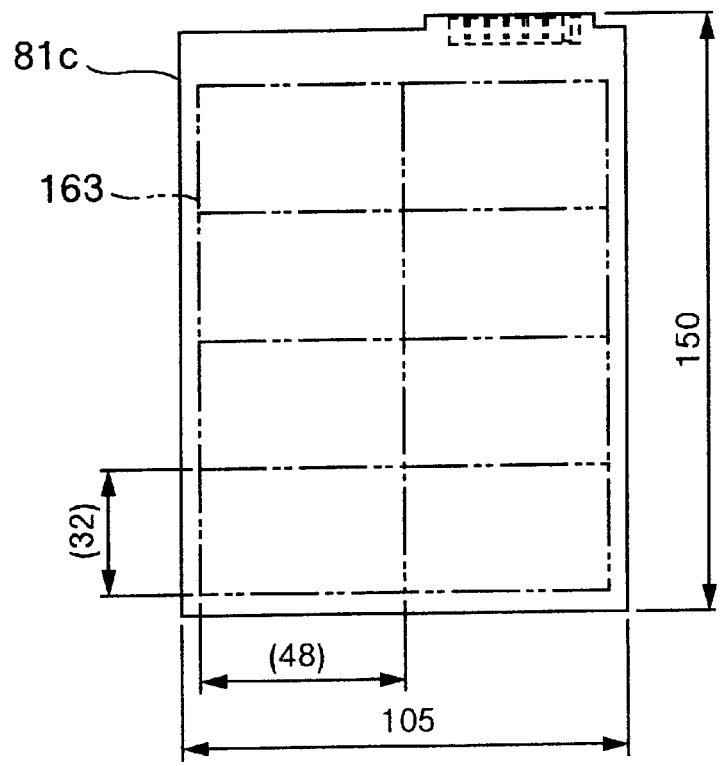
FIG. 57 is a plan view of a cased battery according to one embodiment of the present invention.
Figure 58:
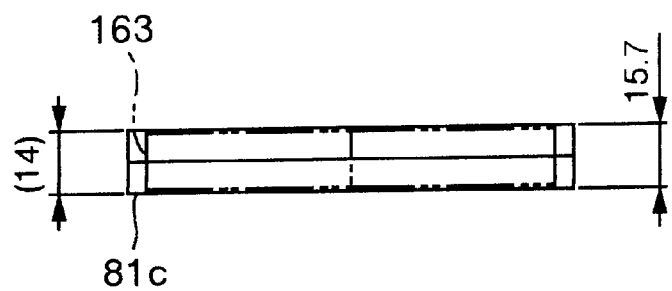
FIG. 58 is a front view of a cased battery according to one embodiment of the present invention.
Figure 59:
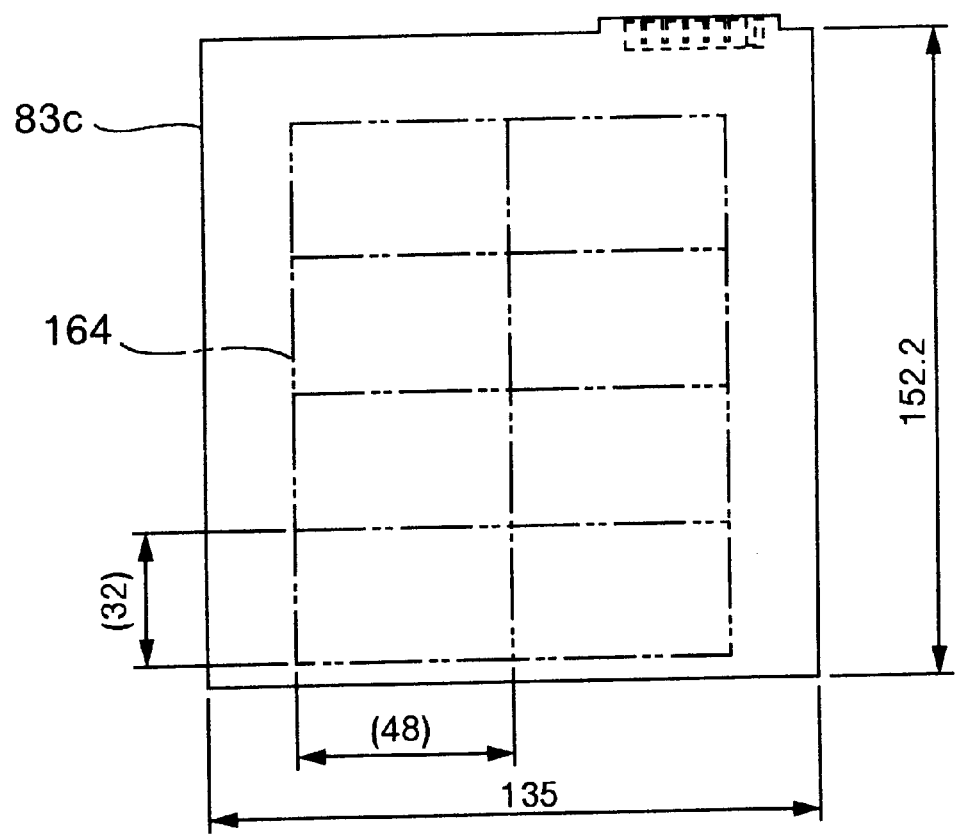
FIG. 59 is a plan view of another cased battery according to one embodiment of the present invention.
Figure 60:
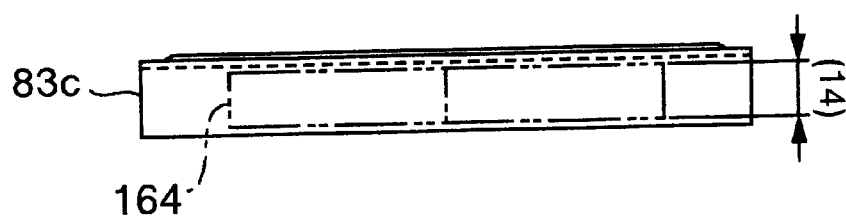
FIG. 60 is a front view of another cased battery according to one embodiment of the present invention.

Incidentally, with this embodiment, the FD•D 81 and the CD-ROM•D 83 are provided in the B/S casing 90, but the HD•D 82 can be further provided as shown in FIGS. 21 and 22. Besides, for a kind of high-density record medium, such as LS-120 or ZIP, that has begun to be used in recent years in place of the FD•D 81, for example, an LS-120•D or ZIP•D for the record/playback can be also provided. As shown in FIGS. 53 and 54, the dimensions of an LS-120•D 161 are 96 mm in width and 126 mm in depth and any dimension is smaller than that of a cased FD•D 81, so that it can be housed in the B/S casing 90 together with a CD-ROM•D 83 and HD•D 82. Besides these, in the B/S casing 90, an external storage such as DVD• (Digital Video Disk) D can be also in the B/S casing 90. Furthermore, a battery may be housed in addition to the external storage like the above. In this case, by diverting the FD•D case 81*c* or the CD-ROM•D case 83*c* to the case for a battery 163 or 164 as shown in FIGS. 57–60, the compatibility with the FD•D 81 or CD-ROM•D 83 can be retained in view of layout.

Figure 24:
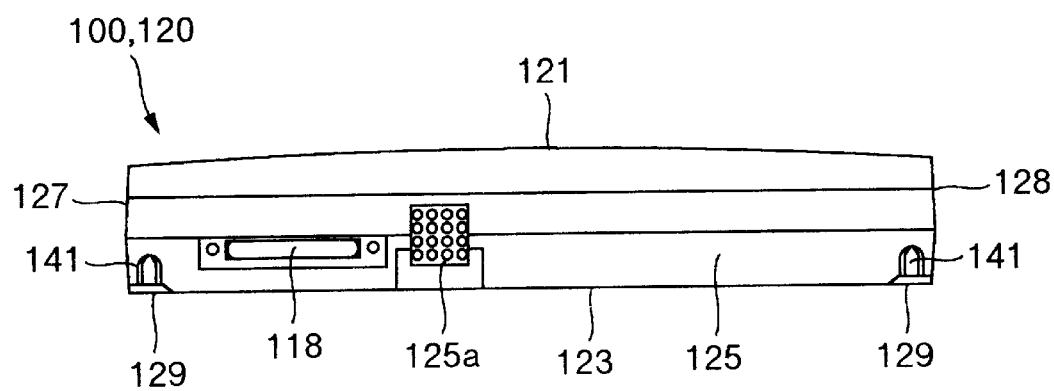
FIG. 24 is a front view of a portreplicator according to one embodiment of the present invention.
Figure 25:
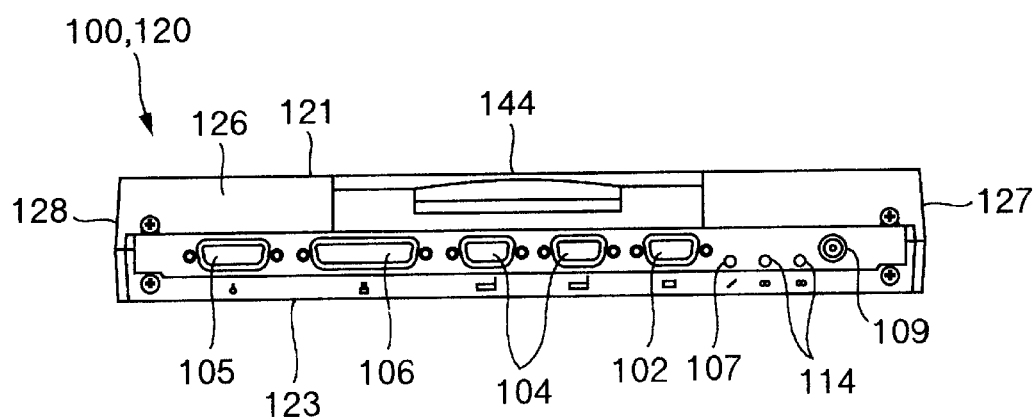
FIG. 25 is a rear view of a portreplicator according to one embodiment of the present invention.

As shown in FIG. 1 and FIGS. 23–27, the P/R casing 120, assuming a nearly rectangular parallelopiped, has a top plate 121, a bottom plate 123 opposed to the top plate 121, a front plate 125, a back plate 126 opposed to the front plate 125, both lateral plates 127 and 128 opposed to each other and a pin guide piece 129 for guiding the connection aid pin 141 (shown in FIG. 35) described later. With this embodiment, the mutual spacing between both lateral plates 127 and 128 of the P/R casing 120, is 310 mm, equal to the mutual spacing between both lateral plates 67 and 68 of the main body casing 60 and between both lateral plates 97 and 98 of the B/S casing 90 as shown in FIG. 25. On the top plate 121 of the P/R casing 120, a lever 144 for moving the connection aid pin 141 is provided oscillatably.

On the front plate 125 of the P/R casing 120, the main body docking connector 118 on the P/R side and the high-temperature air intake 125*a* are provided as shown in FIG. 24. In the front plate 125 of the P/R casing 120, the main body docking connector 118 on the P/R side is provided in such a position as to be connected to the B/S docking connector 59 on the main processing unit side when this front plate 125 is brought into contact with the back plate 66 of the main body casing 60 and both lateral plates 127 and 128 of the P/R casing 120 are made coincident in position with both lateral plates 67 and 68 of the main body casing 60. The pin guide member 129 is provided on both lateral-plate sides and on the bottom-plate side of the front plate 125.

Figure 26:
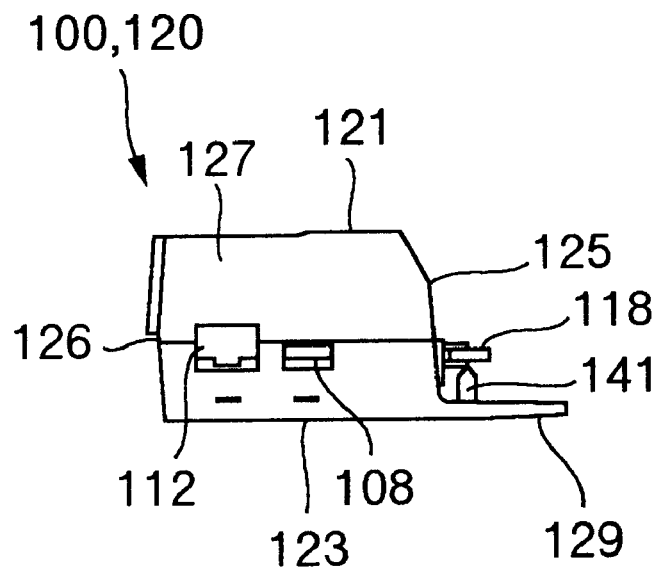
FIG. 26 is a left side view of a portreplicator according to one embodiment of the present invention.
Figure 27:
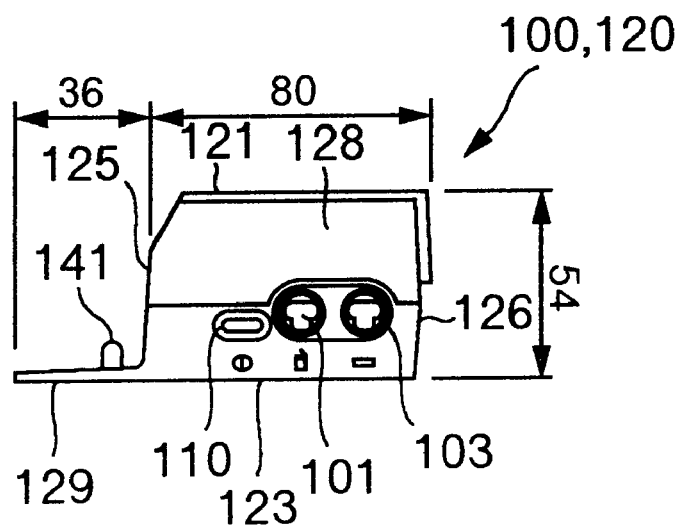
FIG. 27 is a right side view of a portreplicator according to one embodiment of the present invention.

On the back plate 126 of the P/R casing 120, a game port 105, a parallel connector 106, two serial connectors 104 and 104, a display unit connector 102, a microphone connector 107, speaker connectors 114 and 114 and an external power supply connector 109 are provided as shown in FIG. 25. On the left lateral plate 127 of the P/R casing 120, a modem connector 112 and a USB connector 108 are provided as shown in FIG. 26. Besides, on the right lateral plate 128 of the P/R casing 120, a mouse connector 101, a keyboard connector 103 and a power switch 110 are provided as shown in FIG. 27. The depth of this P/R casing 120, or the mutual spacing between the front plate 125 and the back plate 126, is 80 mm. Because of mainly serving to load numerous connectors, the P/R casing 120 is easy in making its depth less than 80 mm. With this embodiment, to enable a PC card slot or the like to be provided afterward and to afford a feeling of presence as a installing base, the depth of the P/R casing 120 is set to 80 mm. Besides, by setting the depth dimension to a relatively large value like this, the stability of single installation can be secured even if this casing is connected to a relatively thick cable such as display unit cable or power supply cable.

In the P/R casing 120, a first link piece 142 and a second link piece 143 for moving the connection aid pin 141 by an action of the lever 144 mentioned above are provided as shown in FIG. 28. These link members 142 and 143, the lever 144 and the connection aid pin 141 compose a main body connection aid mechanism 140. The lever 144 has its base end oscillatably pin-linked with the top plate 121. The middle drum of the lever 144 and one end of the second link member 143 are pin-linked, and the other end of the second link member 143 and one end of the first link member 142 are pin-linked. Fixed at the other end of the first link member 142 is the connection aid pin 141. In the above arrangement, the connection aid pin 141 moves forward when lifting the tip of the lever 144 around its base end and the connection aid pin 141 moves backward when lowering the tip of the lever 144. Incidentally, the actual connecting action of the main body 10 to the portreplicator 100 by means of this main body connection aid mechanism 140 will be described below.

Figure 9:
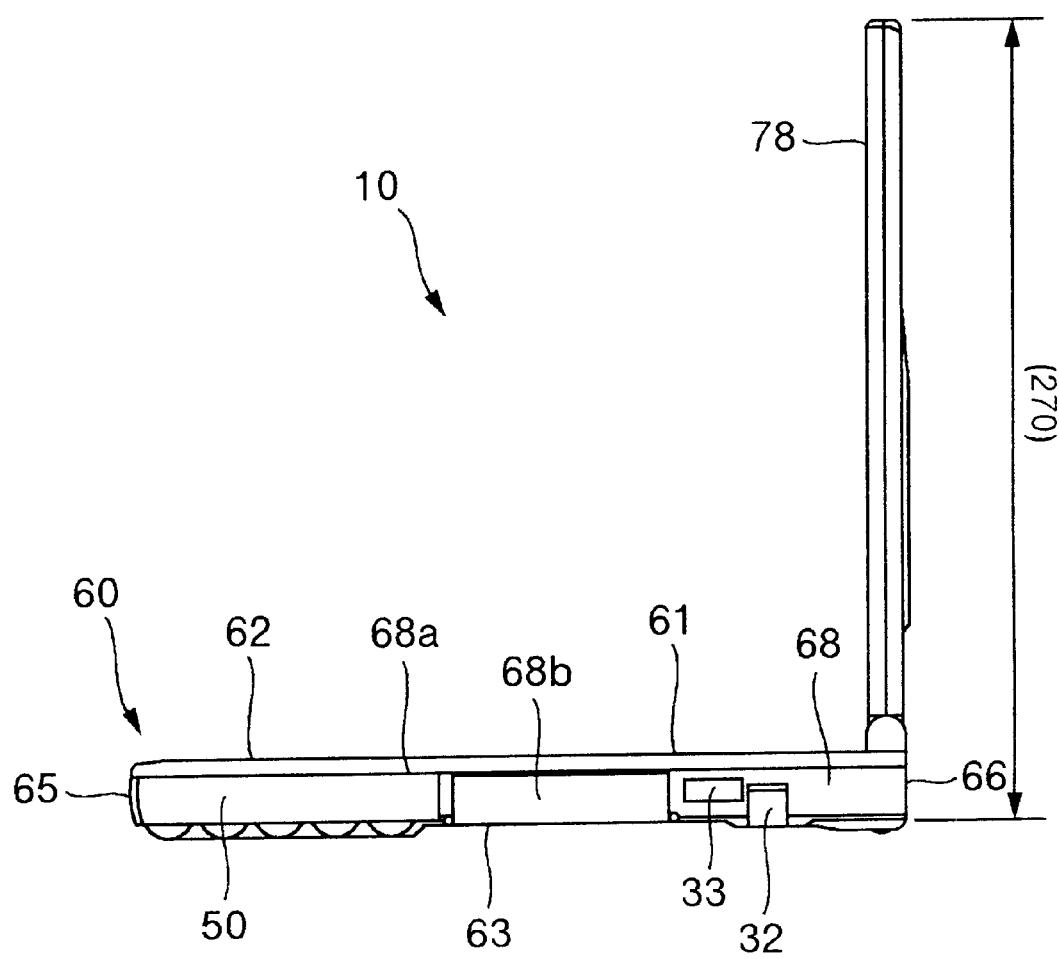
FIG. 9 is a right side view of the main body of an information processing unit according to one embodiment of the present invention (IX—arrowed view in FIG. 5).
Figure 29:
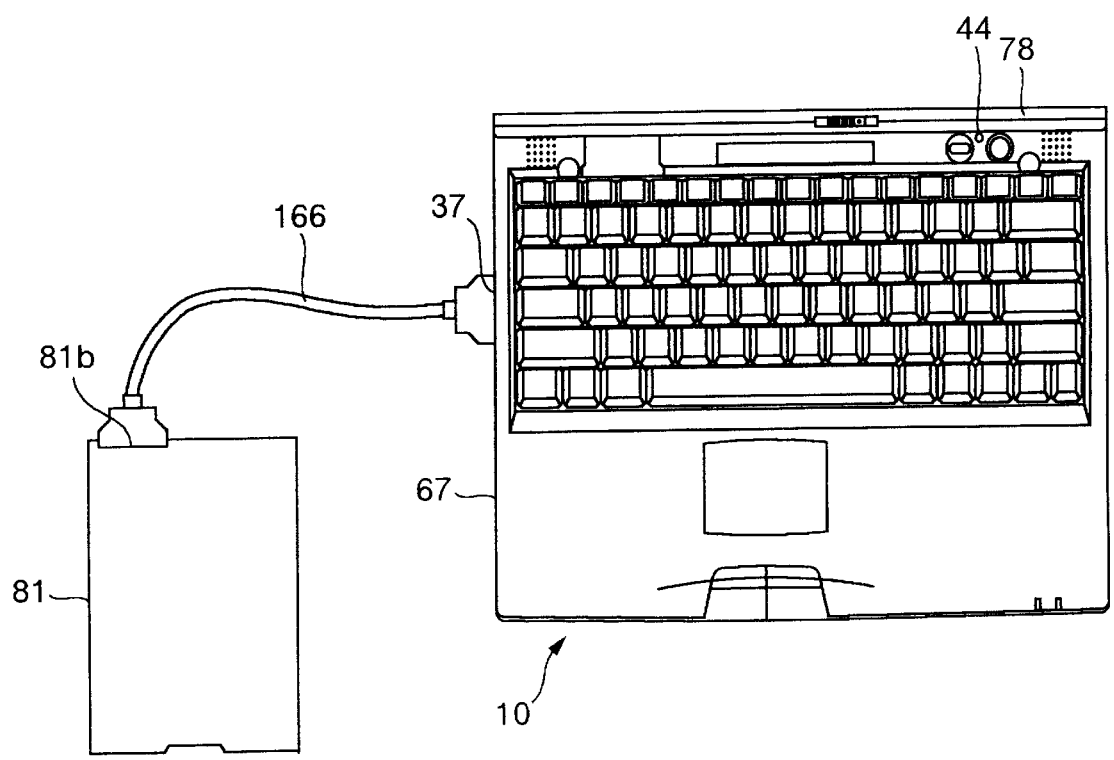
FIG. 29 is a plan view of the main body of an information processing unit according to one embodiment of the present invention, connected to an FD•D.
Figure 30:
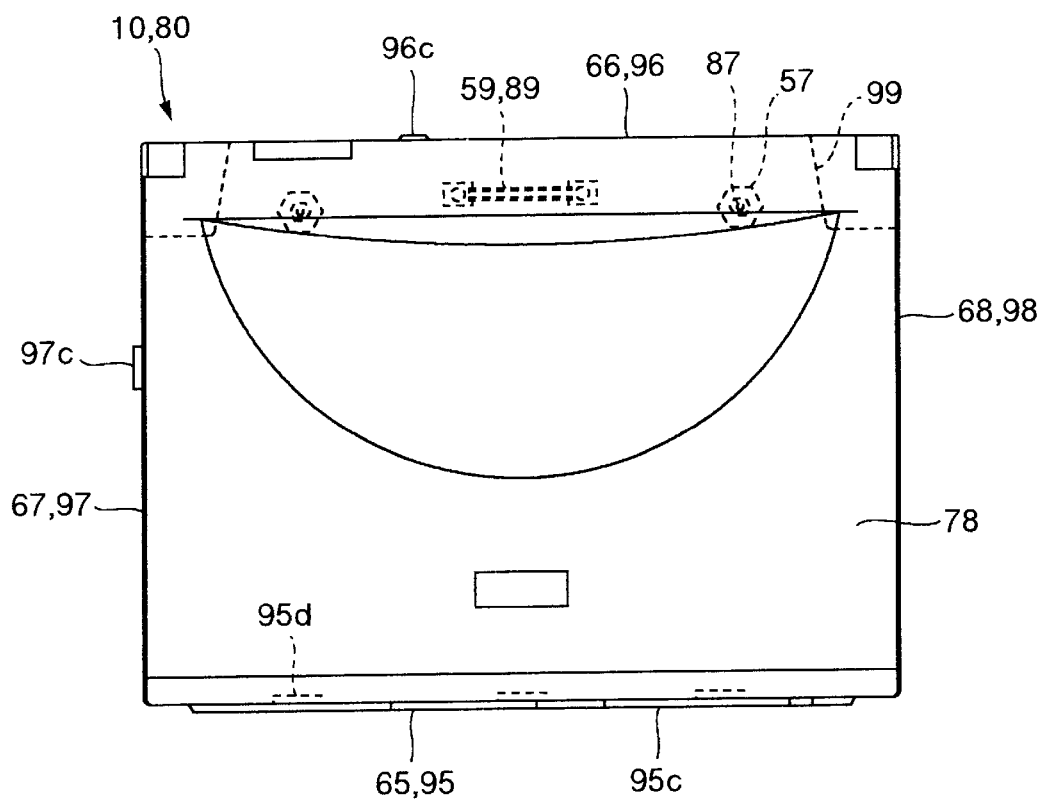
FIG. 30 is a plan view of a file basestation according to one embodiment of the present invention, connected to the main body of the information processing unit.
Figure 31:
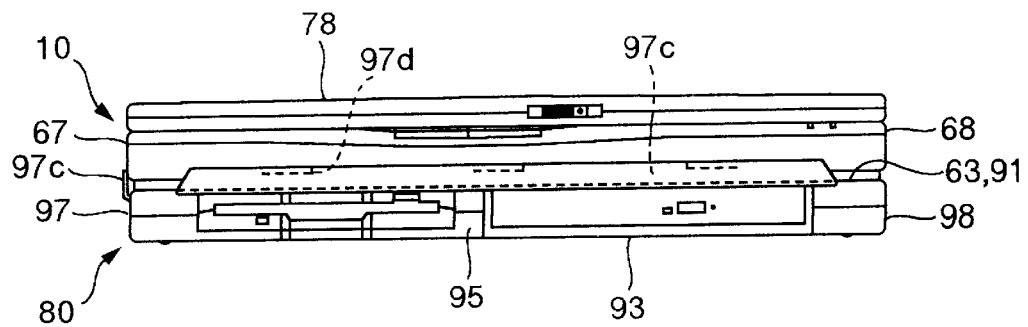
FIG. 31 is a front view of a file basestation according to one embodiment of the present invention, connected to the main body of the information processing unit.
Figure 32:
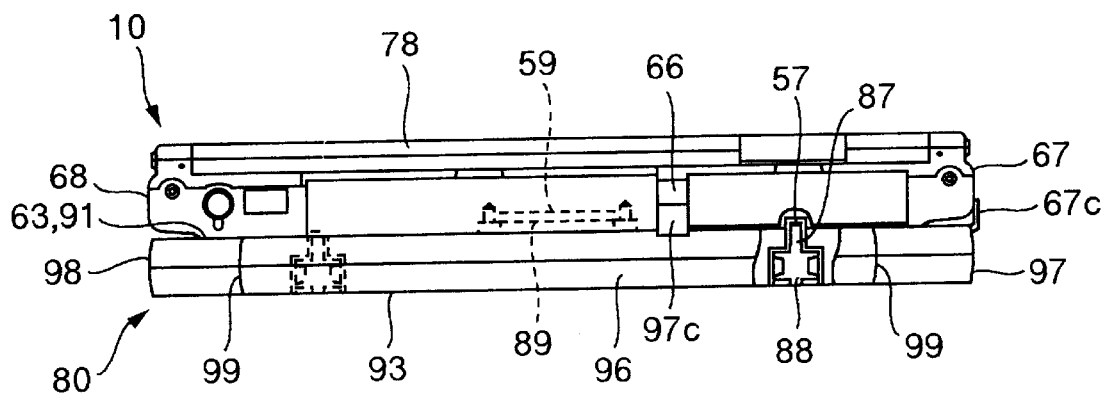
FIG. 32 is a rear view of a file basestation according to one embodiment of the present invention, connected to the main body of the information processing unit.

When singly using the main body 10 of an information processing unit, as shown in FIGS. 5, 6 and 9, the display unit 78 is opened and the power switch 40 provided on the top plate of the main body casing 60 is depressed to start the main body 10. At this time, if an external power supply cable is connected to the external power supply connector 39 of the main body 10, the main body 10 is driven by this external power supply using AC adaptor or driven by the battery 50 in the main body 10 if not connected to the external power supply connector 39 of the main body 10. When it is desired to use an FD, as shown in FIG. 29, connecting the cased FD•D 81 in the B/S casing or the connector 81*b* of the cased FD•D 81 of the same kind to the external FD•D connecting connector 37 provided on the left lateral plate 67 of the main body 10 by means of the cable 166 enables use of an FD in this cased FD•D 81. In ending the use of the main body 10 of the information processing unit, the power switch 40 is depressed and the power supply of the main body 10 is turned off before closing the display unit 78. Incidentally, when closing the display unit 78 without depressing the power switch 40, the display unit 78 depresses the cover down switch 44 provided on the top plate 61 of the main body casing 60, thereby shutting off the power supplied to the display unit 78.

When using the file basestation 80 together with the main body, the main body 10 is superimposed on the top plate 91 of the file basestation 80 as shown in FIGS. 30–33. At this time, since individual positioning guides 95*c*, 96*c* and 97*c* provided on the file basestation 80 comes into contact respectively with the front plate 65, the back plate 66 and the left lateral plate 67 to correctly position the main body 10 to the file basestation 80, the front plate 65, the back plate 66 and both lateral plates 67 and 68 of the main body 10 coincide in position with the front plate 95, the back plate 96 and both lateral plates 97 and 98 of the file basestation 80. Then, the main body docking connector 89 on the B/S side provided on the top plate 61 of the file basestation 80 is connected to the B/S docking connector 59 on the main processing unit side provided on the bottom plate 63 of the main body 10, thereby enabling the receiving/sending of a signal and power between both of them 10 and 80. In an actual case of using the main body 10 under this situation, the display unit 78 is opened and the power switch 40 provided on the top plate 61 of the main body 10 is depressed as with the single use of the main body 10 to start the main body 10 and the file basestation 80. As the power supply of the main body 10 and the file basestation 80, not only the battery of the main body 10 but also an external power source through the external power supply connector 39 of the main body 10 or through the external power supply connector 86 of the file basestation 80 is considered, but under these circumstances, it is preferable to connect the external power source to the external power supply connector 86 of the file basestation 80 and employ this external power source as the drive power source of the main body 10 and the file basestation 80.

Figure 33:
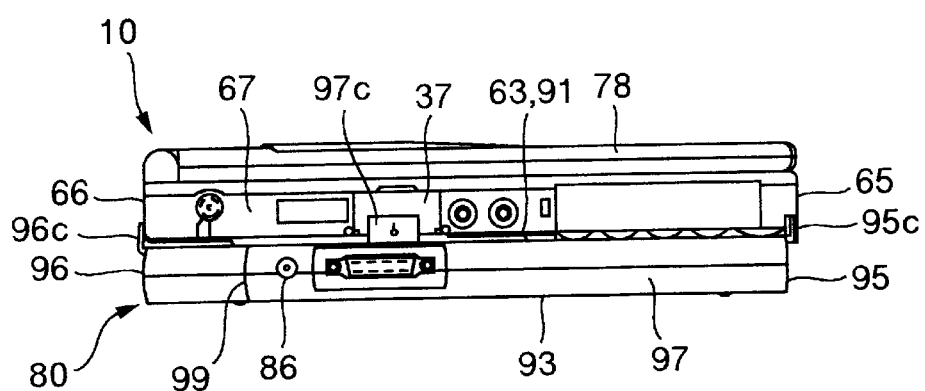
FIG. 33 is a left side view of a file basestation according to one embodiment of the present invention, connected to the main body of the information processing unit.
Figure 34:
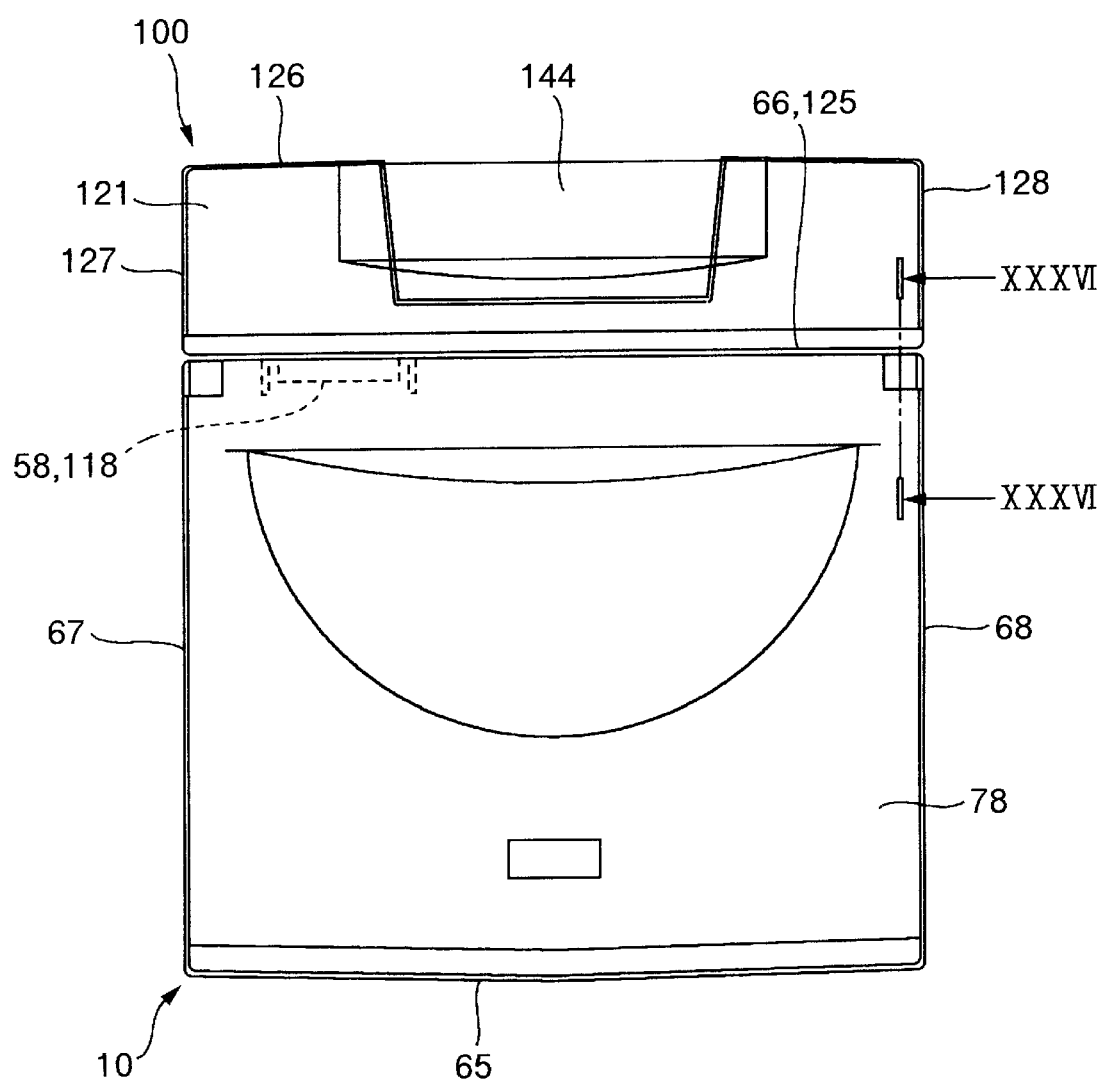
FIG. 34 is a plan view of a portreplicator according to one embodiment of the present invention, connected to the main body of the information processing unit.

In the connected situation of the main body 10 to the file basestation 80, as shown in FIG. 33, the left-lateral plate positioning member 97c (connector connection regulating member) provided on the left lateral plate 97 of the B/S casing 90 covers a part of the external FD•D connecting connector 37. As a result, in the connected situation of the main body 10 to the file basestation 80, the FD•D 81 cannot be connected via a cable to an external FD•D connecting connector 37 and the FD•D 81 in the B/S casing 90 ends in being used exclusively.

When the main body 10 and the file basestation 80 are carried with both being connected, the linking knob 88 exposed from the bottom plate 93 of the B/S casing 90 is rotated and the liking bolt 87 of the B/S casing 90 is screwed into the linked nut 57 provided on the bottom plate 63 of the main body 10 as described referring to FIGS. 19 and 20. Then, not only by the connection using the docking connectors 59 and 89 of both and the one using the front-plate positioning member 95c but also by that of the linking bolt 87 of the file basestation 80 to the linked nut 57 of the main body 10, the main body 10 and the file basestation 80 are firmly linked.

Figure 28:
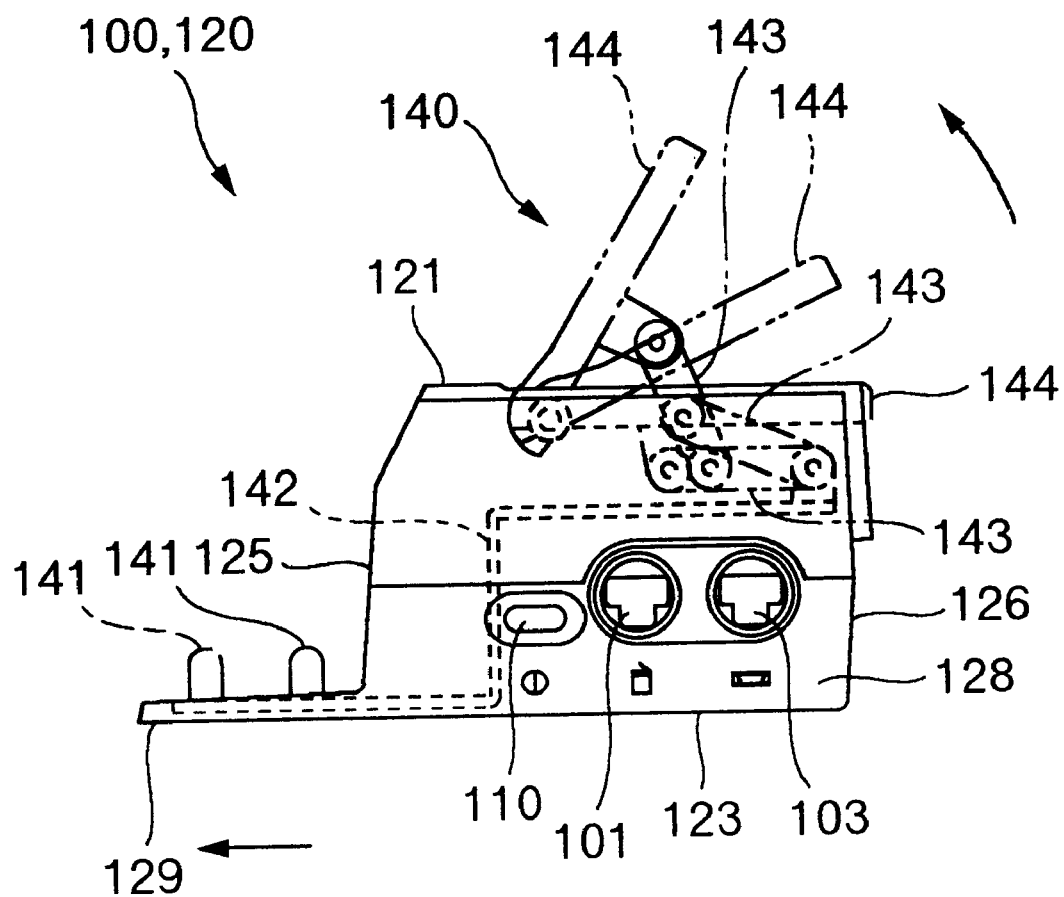
FIG. 28 is an illustration of a connection aid mechanism according to one embodiment of the present invention.
Figure 36:
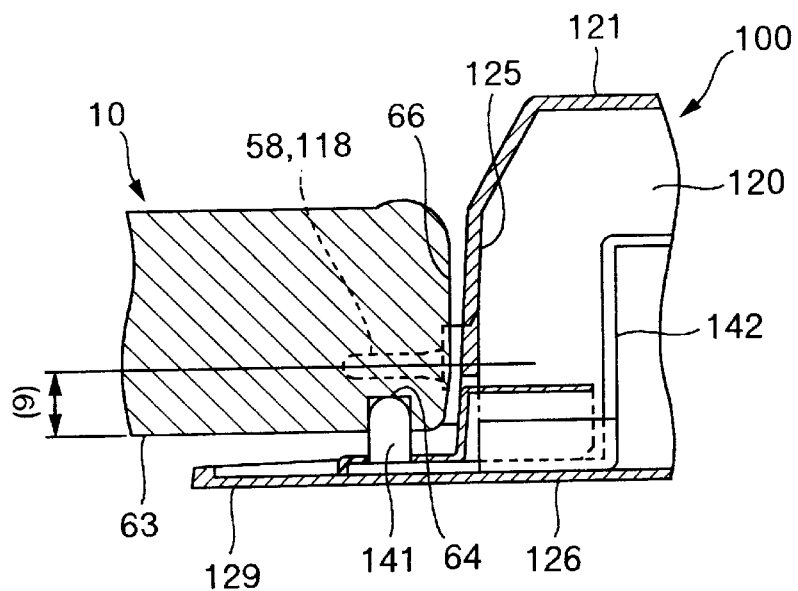
FIG. 36 is a sectional view taken along the line XXXVI—XXXVI of FIG. 34.

In the case of using the main body 10 and the portreplicator 100, first, the lever 144 of the portreplicator 100 is lifted and the connection aid pin 141 is positioned forward as shown in FIG. 28. Under this situation, the connection aid pin 141 of the portreplicator 100 is put into the pin hole 64 formed on the bottom plate 63 of the main body 10 as shown in FIG. 36. And on depressing the lever 144 of the portreplicator 100, the connection aid pin 141 moves backward to connect the P/R docking connector 58 on the main processing unit side 10 to the main body docking connector 118 on the P/R side, thereby enabling the receiving/sending of a signal and power between both of them 10 and 100. In an actual case of using the main body 10 under this situation, the display unit 78 is opened and the power switch 40 provided on the top plate 61 of the main body 10 is depressed as with the single use of the main body 10 to start the main body 10 and the portreplicator 100. As the power supply of the main body 10 and the portreplicator 100, not only the battery 50 of the main body 10 but also an external power source through the external power supply connector 39 of the main body 10 or through the external power supply connector 109 of the portreplicator 100 is considered, but under this situation, it is preferable to connect the external power source to the external power supply connector 109 of the portreplicator 100 and employ this external power source as the drive power source of the main body 10 and the portreplicator 100. Since the portreplicator 100 is equipped with similar connectors, such as, to be specific, a modem connector 112, a serial connector 104, a parallel connector 106, a display unit connector 102, a USB connector 108, a mouse connector 101 and an external power supply connector 109, to various connectors provided on the main processing unit side 10, it is preferable to use these connectors 112, 104, 106, 102, 108, 101 and 109 without use of the connectors 32, 34, 36, 42, 38, 41 and 39 of the main body 10. In this manner, a preferential use of various connectors of the portreplicator 100 in a connected situation of the portreplicator 100 and the main body 10 can omit the labor of disconnecting the cable connected to each connector when carrying the main body 10 with it removed from the portreplicator 100.

With this embodiment, the level difference between the bottom plate 63 of the main body 10 and the main body docking connector 118 on the P/R side is 9 mm as shown in FIG. 36. In the connected situation of the main body 10 and the portreplicator 100, the back-face side of the bottom plate 63 of the main body 10 is kept to float both from the mounting plane of a desk or the like and from the pin guide member 129 of the portreplicator 100 with the bottom of the pin hole 64 of the main body 10 supported on the tip of the connection aid pin 141 in order to make the level of the P/R docking connector 58 on the main processing unit side from the mounting plane of a desk or the like coincident with the level of the main body docking connector 118 on the P/R side from the mounting plane.

Figure 37:
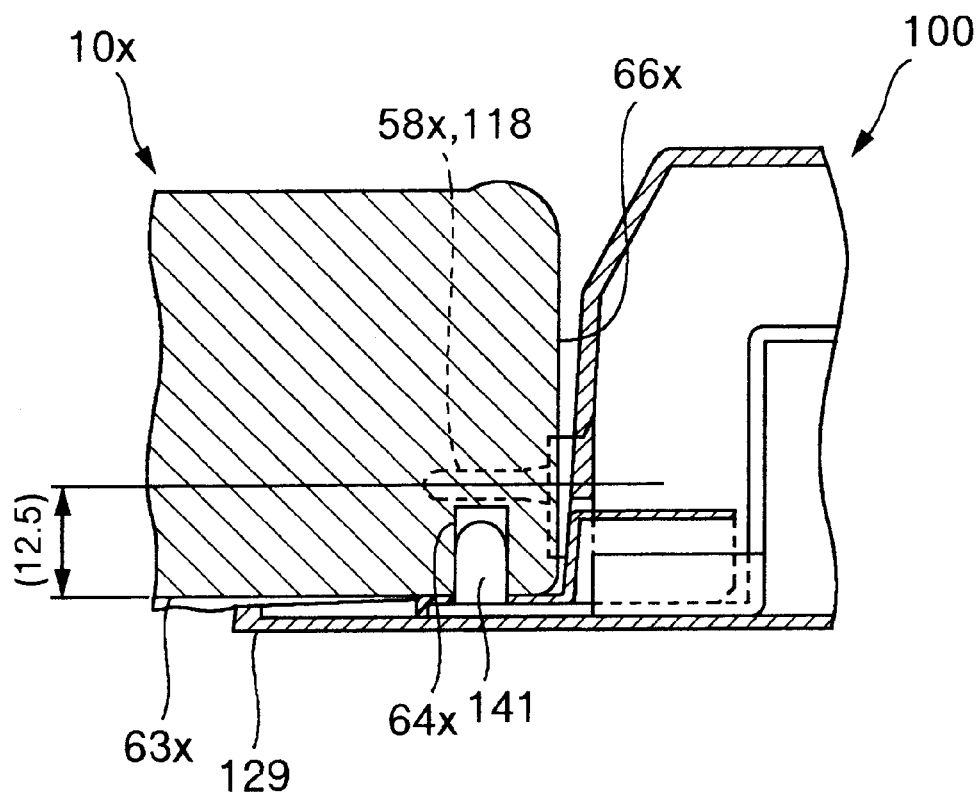
FIG. 37 is a principally sectional view of a portreplicator according to one embodiment of the present invention, connected to the main body of another information processing unit.

Such floating of the back-face side of the bottom plate 63 of the main body 10 both from the mounting plane of a desk or the like and from the pin guide member 129 of the portreplicator 100 is for the purpose of making a portreplicator 100 according to this embodiment usable for the main body 10x of another information processing unit as shown in FIG. 37. The main body 10x of another information processing unit shown in FIG. 37 has a CPU higher in performance than the main body 10 of the information processing unit mentioned above and its thickness is large. Besides, in another information processing unit 10x, the level difference between the bottom plate 63x of the main body 10x and the main body docking connector 58x on the P/R side is 12.9 mm. In a connected situation of this other main body 10x to the portreplicator 100, the back side of the bottom plate 63x this other main body 10x is supported on the pin guide member 129 of the portreplicator 100 with the bottom of the pin hole 64x of this other main body 10x kept out of contact with the tip of the connection aid pin 141 in order to make the level of the P/R docking connector 58x on the main processing unit side from the mounting plane of a desk or the like coincident with the level of the main body docking connector 118 on the P/R side from the mounting plane. Namely, the difference of the level difference between the bottom plate 63x of the main body 10x and the P/R docking connector 58x on the main processing unit side from the level difference between the bottom plate 63 of the main body 10 and the P/R docking connector 58 on the main processing unit side can be coped with by a change in the respective depth of the pin holes 64 and 64x. Incidentally, the high-temperature air intake 125a mentioned above by referring to FIG. 24 in the front plate 125 of the P/R casing 120 for exhausting a high-temperature air from the back plate 66x (FIG. 37) of the main body 10x of this other information processing unit is provided to cool the high performance CPU when the main body 10x of another information processing unit is connected to the portreplicator 100.

Figure 38:
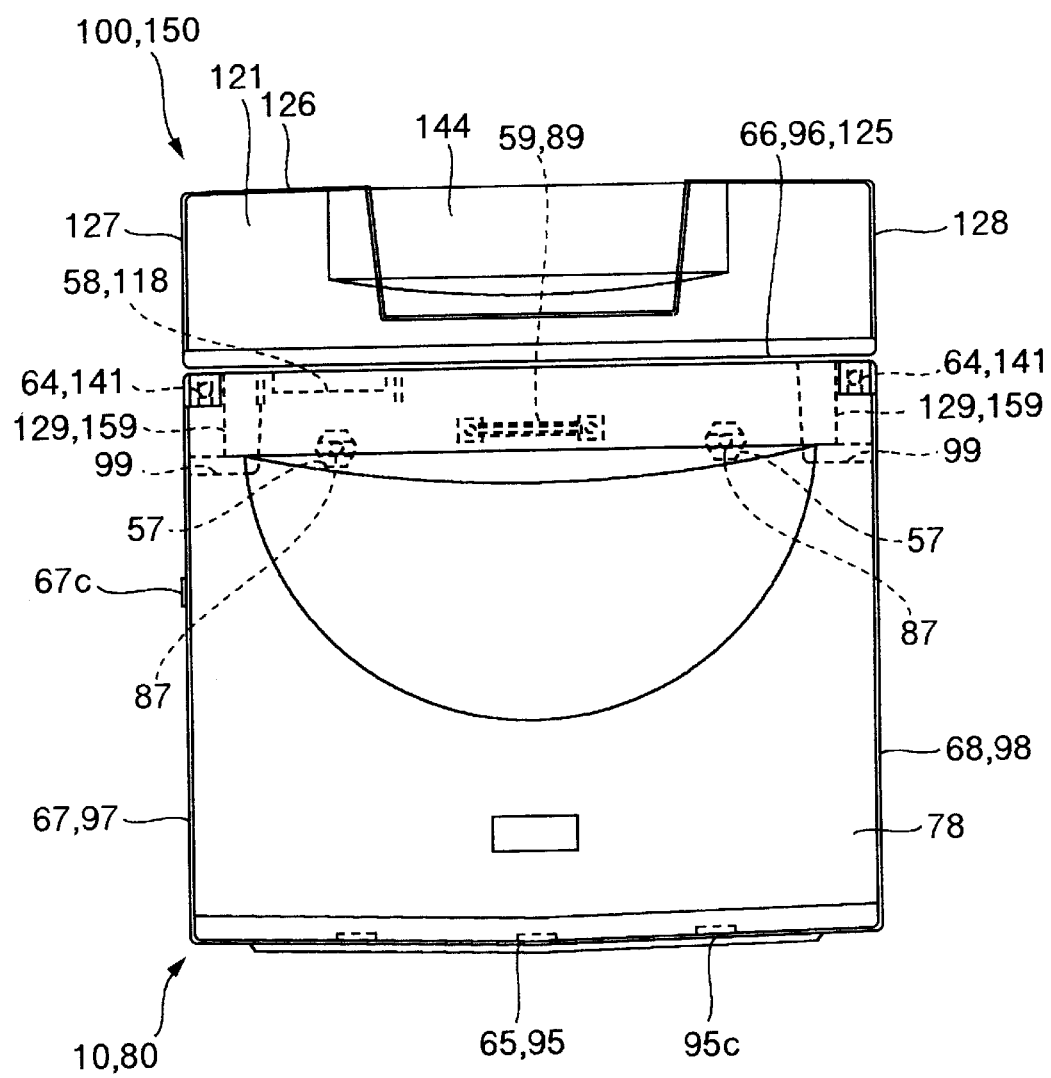
FIG. 38 is a plan view of the main body of an information processing unit according to one embodiment of the present invention, connected to a file basestation and a portreplicator.
Figure 39:
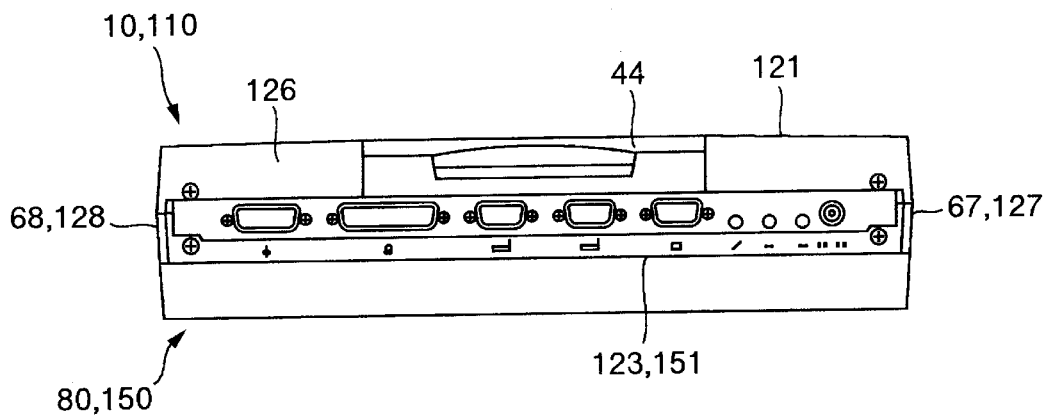
FIG. 39 is a rear view of the main body of an information processing unit according to one embodiment of the present invention, connected to a file basestation and a portreplicator.
Figure 40:
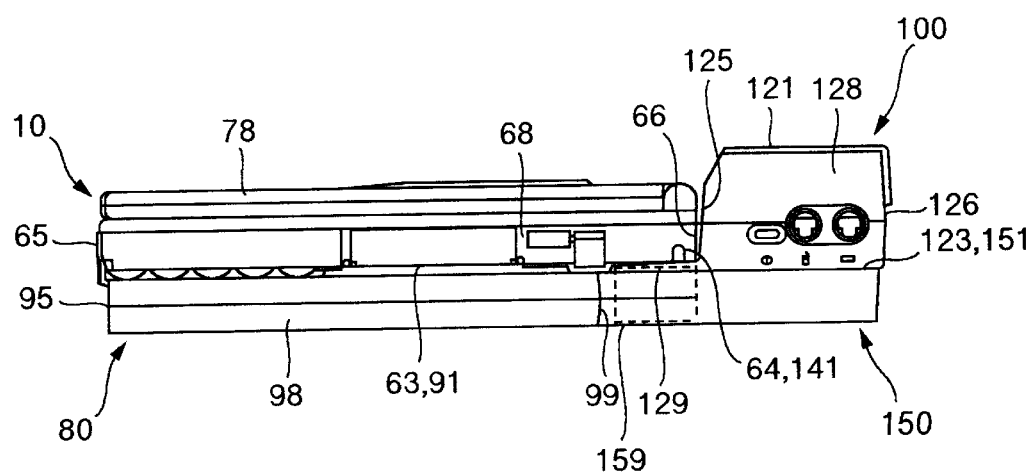
FIG. 40 is a right side view of the main body of an information processing unit according to one embodiment of the present invention, connected to a file basestation and a portreplicator.

In the case of the above information processing units at the main manipulating place of an operator, its use in a connection of the main body 10 of an information processing unit to a file basestation 80 and to a portreplicator 100 is preferable as shown in FIGS. 38–40. In this case, as shown in FIG. 40, the main body 10 and the portreplicator 100 end in floating from the mounting plane of a desk or the like by the thickness of a file basestation 80. Because of being placed on the file basestation 80, the main body 10 has no problem, but the portreplicator 100 is forced to fall into a suspended situation due to the occurrence of its space from the mounting plane. Thus, in this embodiment, a height adjusting stand 150 is used which is substantially equal in thickness to the file basestation 80, and has a top plate 151 so shaped as to be overlapped on the bottom plate 123 of the portreplicator 100 and the pin guide member 129 integrated therewith. Incidentally, in a connected situation of all the three 10, 80 and 100, the pin guide member support portion 159 of this height adjusting stand 150 interposes in the recess 99 of the file basestation 80.

When using the main body 10 of the information processing unit to the file basestation 80 and the portreplicator 100 in their connected situation, the display unit 78 is opened and the power switch 40 provided on the top plate 61 of the main body 10 is depressed as with the single use of the main body 10 to start all the three of 10, 80 and 100. Besides, as mentioned above, when inserting a CD-ROM in the CD-ROM•D 83 of the file basestation 80 and listening to the music or the like recorded in this CD-ROM, the power switch 110 of the portreplicator 100 may be depressed to start all the three of 10, 80 and 100 with the display unit 78 kept close.

In a connected situation of all the three of 10, 80 and 100, a preferential use of various connectors of the portreplicator 100 is preferred as with a connection of both the main body 10 and the portreplicator 100. This is because the labor of disconnecting the cable of each connector can be omitted both in the case of carrying the main body 10 of its own, or carrying the file basestation 80 together with the main body 10.

Figure 41:
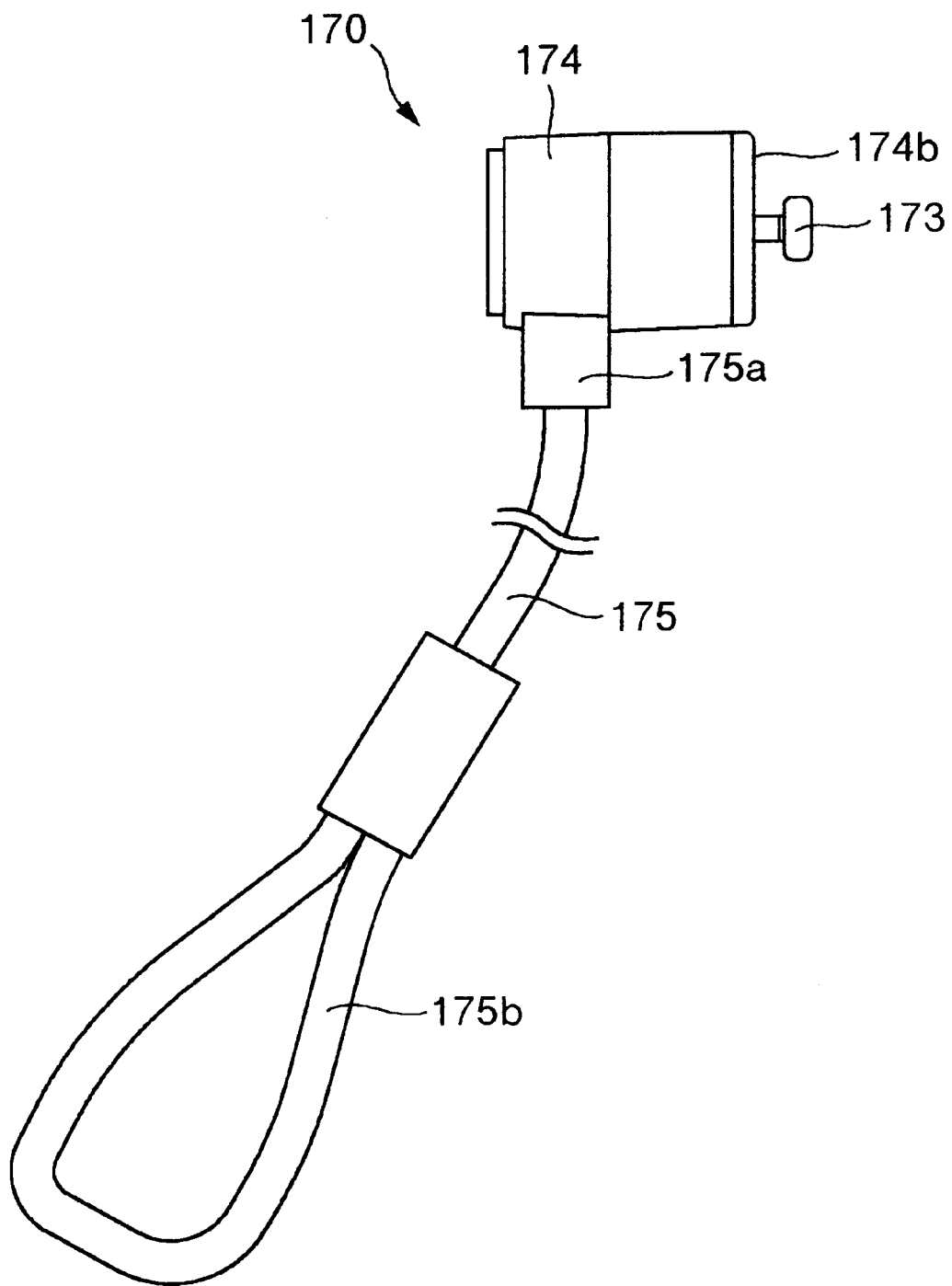
FIG. 41 is a side view of a cylinder lock according to one embodiment of the present invention.
Figure 42:
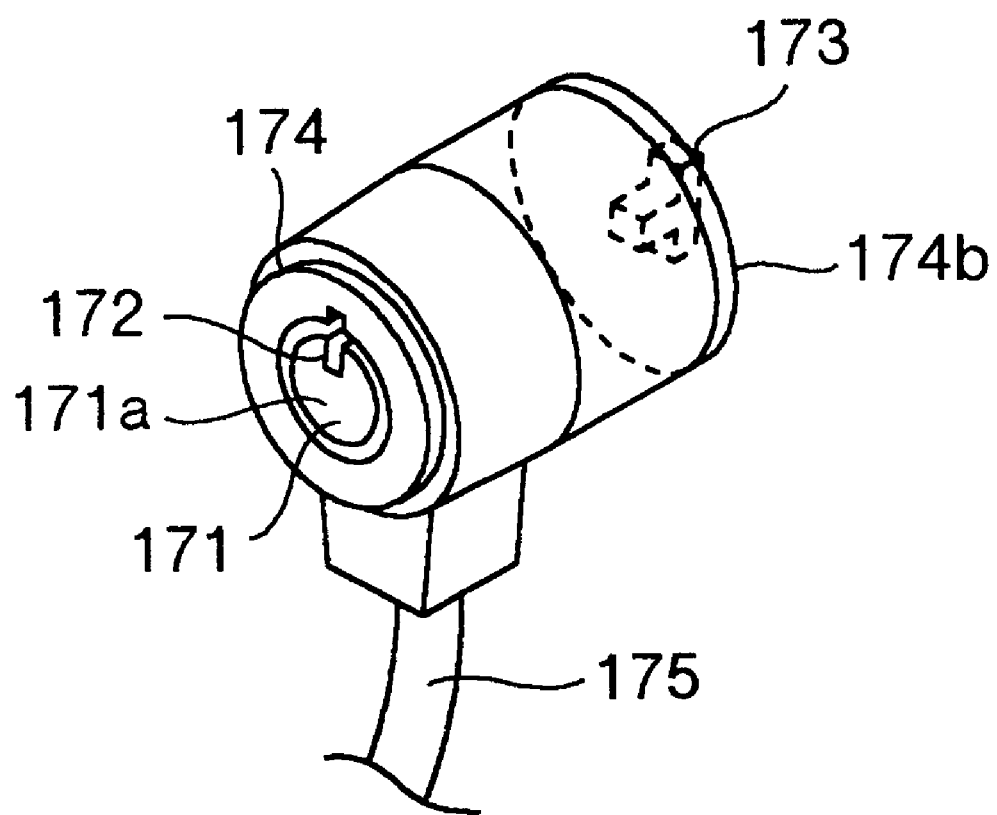
FIG. 42 is a perspective view of a cylinder lock according to one embodiment of the present invention.

In recent years, to prevent the theft of information processing units at sale stores of information processing unit, a cylinder lock 170 with a linking wire 175 attached, referred to as Kensington lock is used as shown in FIG. 41. As shown in FIG. 42, this cylinder lock 170 comprises an inner cylinder 171 with a key groove 172 formed on one end face 171a, a hook section 173 fixed on the other end face of the inner cylinder 171 and an outer cylinder 174 for housing the inner cylinder 171. As shown in FIG. 41, the liking wire 175 has one end 175a attached to the outer cylinder 174 of the cylinder lock 170 and a linking portion 175b formed on the other end. The inner cylinder 171 becomes rotatable together with a key to the outer cylinder 174 when the key is inserted into the key groove 172 and unrotatable to the outer cylinder 174 with no key in section into the key groove 172. The hook section 173 fixed to the other end face of the inner cylinder 171 protrudes from the other end face 174b of the outer cylinder 174 and rotates with the rotation of the inner cylinder 171. In the casing of an information processing unit, a lock hole is formed in advance through which a key can be inserted if the hook section 173 of the cylinder lock 170 has a specific rotation angle to the casing and cannot be removed unless the hook section 173 becomes a specific rotation angle once the key is inserted. And, the hook section 173 of the cylinder lock 170 is put into the lock hole on the casing, a key is thrusted into the key groove 172 of the cylinder lock 170 and the inner cylinder 171 and the hook section 173 are rotated with the rotation of this key to make the hook section 173 unremovable out of the lock hole, that is, to make the cylinder lock 170 undetachable from the casing. On the other hand, the linking portion 175b of the linking wire 175 attached to the outer cylinder 174 of the cylinder lock 170 is hung on a bar or the like of commodity shelves. Then, the information processing unit is linked with a bar or the like of commodity shelves via a so-called Kensington lock 170.

Formerly, in cases where information processing units equipped with detachable FD•D, HD•D or the like are placed at the store, information processing units with FD•D, HD•D or the like detached are linked with bars or the like of commodity shelves via Kensington locks 170 in order to prevent the theft. However, detaching the FD•D, HD•D, even if needed for the prevention of theft, results in no sufficient exhibition of performances of information processing units arranged at the store, thus incurring dissatisfaction for users. Besides, in general work places, a work of detaching the FD•D, HD•D or the like intentionally for the prevention of theft when information processing units are out of use and of inserting the FD•D, HD•D or the like when in use is very troublesome.

Figure 43:
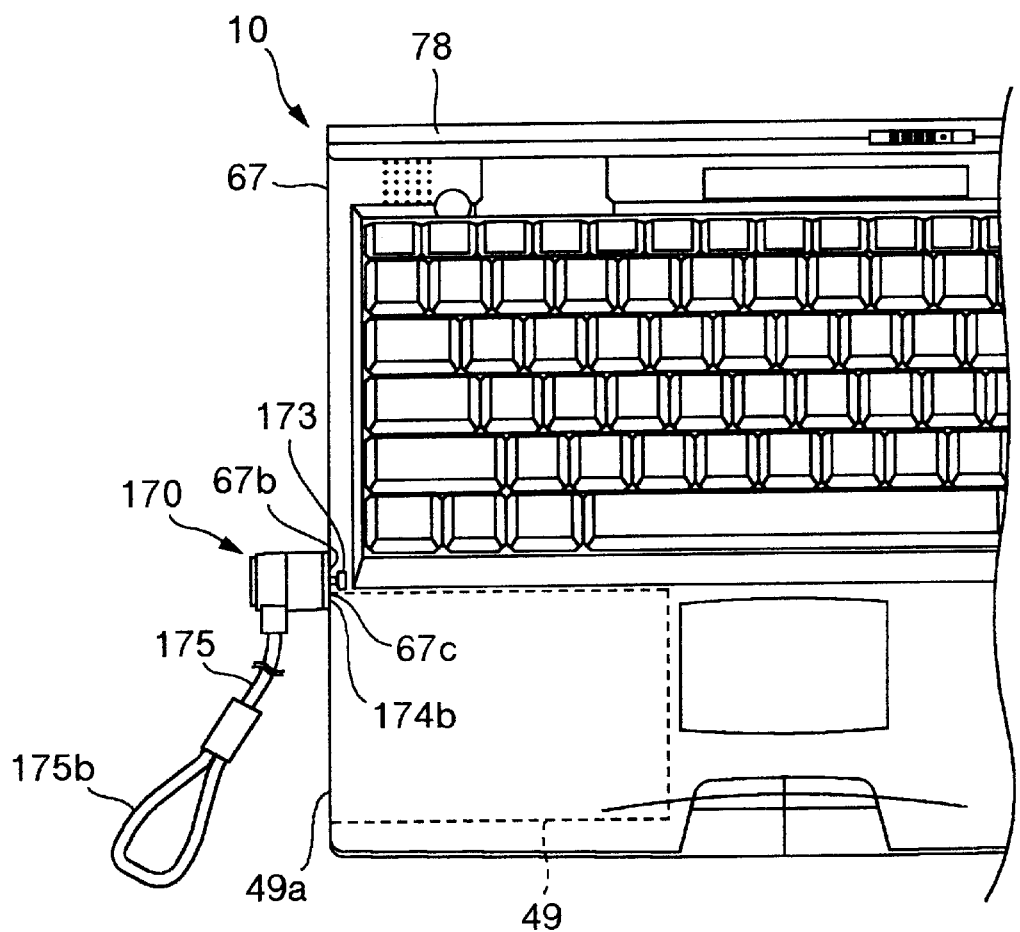
FIG. 43 is a plan view of a cylinder lock, connected to the main body of an information processing unit according to one embodiment of the present invention.
Figure 44:
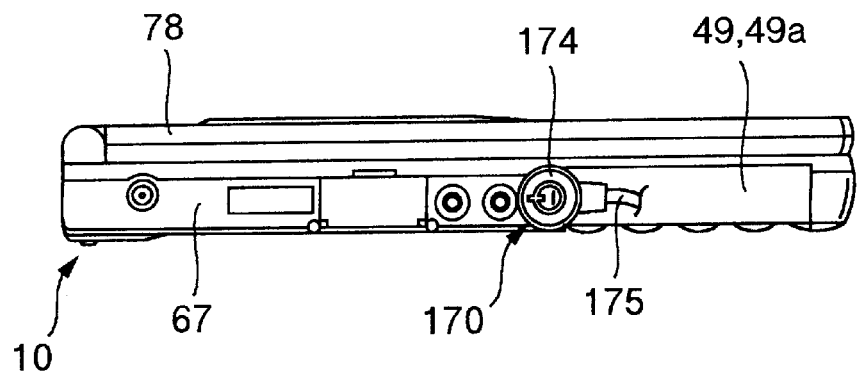
FIG. 44 is a left side view of a cylinder lock, connected to the main body of an information processing unit according to one embodiment of the present invention.

Such being the case, in this embodiment, as shown in FIG. 8, the lock hole 67b mentioned above is formed near the HD•D insert port 67c of the main body casing 60. If a lock hole 67b is formed near the HD•D insert port 67c of the main body casing 60 like this, a part of the outer cylinder 174 of the cylinder lock 170 juts out to the HD•D insert port 67c when attaching a cylinder lock 170 to this lock hole 67b and the front end face 49a of the HD•D 49 comes into contact with the outer cylinder 174 of the cylinder lock 170 as shown in FIGS. 43 and 44, so that the HD•D 49 cannot be detached from the main body casing 60. Thus, the formation of a lock hole 67b near the HD•D insert port 67c of the main body casing 60 can prevent the theft of the main body 10 of an information processing unit and moreover the theft of an HD•D 49 even without intentional removal of the HD•D 49 from the main body 10.

Incidentally, here, an HD•D 49 detachable from the main body of an information processing unit is taken as an example, but a similar fact is enabled for an FD•D 81 or a CD-ROM•D 83 detachable from the file basestation 80 as an information processing related unit. Namely, the provision of a lock hole near the FD•D insert port 95a or the CD-ROM•D insert port 95b of the B/S casing 90 can prevent the theft of an FD•D 81 or CD-ROM•D 83. Besides, any of these relates to external storages taken as examples, but is not limited to external storages and a similar fact is enabled for those detachable from the casing, such as, e.g., battery and the like.

ADVANTAGES OF THE INVENTION

According to the present invention, since the information processing unit comprises a main body, a file basestation and a portreplicator to which many cables are connected, removal of the main body alone or removal of the main body and the file basestation can omit the labor of disconnecting many individual cables connected to the portreplicator both in the case of singly carrying the main body and in the case of carrying the file basestation together with the main body.

What is claimed is:

1. An information processing unit with a keyboard, a display unit, a storage and a plurality of connectors for the signal connection to the external equipment, comprising:

a main body having said keyboard, a CPU, a memory, a main body casing for mounting these and said display unit attached to the main body casing;

a file basestation having a plurality of external swappable storages and a file basestation casing for housing them; and a portreplicator having a plurality of said connectors and a portreplicator casing for mounting them, wherein said main body has a first docking connector on the main processing unit side for receiving/sending a signal from/to said file basestation and a second docking connector on the main processing unit side for receiving/sending a signal from/to said portreplicator;

said file basestation has a docking connector on the file basestation directly connected to said first docking connector on the main processing unit side for receiving/sending a signal from/to said main body; and said portreplicator has a docking connector on the portreplicator side directly connected to said second docking connector on the main processing unit side for receiving/sending a signal from/to said main body.

2. An information processing unit as set forth in claim 1, wherein said main body casing, taking the shape of a nearly rectangular parallelopiped, has a top plate with the key face of said keyboard exposed therefrom, a bottom plate opposed to the top plate, a front plate facing to the side of properly operating the keyboard, a back plate opposed to the front plate and two lateral plates opposed to each other, said file basestation casing, taking the shape of a nearly rectangular parallelopiped, has top and bottom plates mutually opposed to each other, front and back plates mutually opposed to each other at a distance substantially identical to the mutual one of said front and back plates of said main body casing and two lateral plates opposed to each other at a distance substantially identical to the mutual one of said lateral plates of said main body casing, said portreplicator casing has top and bottom plates opposed to each other, front and back plates opposed to each other and two lateral plates opposed to each other at a distance substantially identical to the mutual one of said lateral plates of said main body casing, said first docking connector on the main processing unit side of the said main body is provided on said bottom plate of the said main body casing, said second docking connector on the main processing unit side of the above main body is provided on said back plate of said main body casing, said docking connector on the file basestation side is provided at a position as comes into contact with said first docking connector on the main processing unit side when bringing said top plate of said file basestation casing into contact with said bottom plate of said main body casing, making said front plate of the file basestation casing substantially coincident in position with the front plate of said main body casing and making said lateral plates of the file basestation casing substantially coincident in position with the lateral plates of said main body casing, and said docking connector on the portreplicator side is provided at a position as comes into contact with said second docking connector on the main processing unit side when bringing said top plate of said portreplicator casing into contact with said back plate of said main body casing, making said two lateral plates of the portreplicator casing substantially coincident in position with said two lateral plates of said main body casing.

3. An information processing unit as set forth in claim 1, wherein a cylinder lock having an inner cylinder with a key groove formed on one end face, a hook section fixed on the other end face and an outer cylinder for housing the inner cylinder rotatably when inserting a key in the key groove or unrotatably when inserting no key in the key groove, wherein said outer cylinder has one end face with the one end face of said inner cylinder exposed and the other end face with the hook section fixed on the other end face of the inner cylinder protruding, and at least one of said main body, said file basestation and said portreplicator has a device which can be housed in its casing and also detachable from the casing and whose end face is exposed from the casing when housing is conducted in the casing, a lock hole is formed on said casing which can be inserted into the casing when the hook section of said cylinder lock is at a specific rotation angle to the casing and cannot come off unless it becomes at the specific rotation angle to the casing once inserted, and said lock hole is formed at a position among the surface of said casing where the other end face of the outer cylinder of the cylinder lock is touchable to the end face of said device inserted in the casing when the hook section of said cylinder lock is inserted into the lock hole.

4. An information processing unit as set forth in claim 1, wherein the above main body casing has a top plate with the key face of the above keyboard exposed, whose outside surface undergoes an antimicrobial treatment.

5. An information processing unit as set forth in claim 2, wherein a high-temperature air intake is formed on the front plate of said portreplicator casing.

6. An information processing unit as set forth in claim 2, wherein said main body has an external power supply connector for receiving the external power and/or a battery, a power switch and power supply control means connected not only to the external power supply connector and/or the battery by means of a power supply line but also to the power switch by means of a signal line.

7. An information processing unit as set forth in claim 6, wherein said file basestation has an external power supply connector for receiving the external power, and the external power supply connector of said file basestation is connected via said first docking connector on the main processing unit side and said docking connector on the file basestation side to said power supply control means of said main body by means of the power supply line when the first docking connector on the main processing unit side and the docking connector on the file basestation side are connected.

8. An information processing unit as set forth in claim 6, wherein said portreplicator has an external power supply connector for receiving the external power and the external power supply connector of said portreplicator is connected via the second docking connector on the main processing unit side and the docking connector on the portreplicator side to said power supply control means of said main body by means of the power supply line when the second docking connector on the main processing unit side and the docking connector on the portreplicator side are connected.

9. An information processing unit as set forth in claim 6, wherein said file basestation has a power switch, and the power switch of said file basestation is connected via the first docking connector on the main processing unit side and the docking connector on the file basestation side to said power supply control means of said main body by means of said signal line when the first docking connector on the main processing unit side and the docking connector on the file basestation side are connected.

10. An information processing unit as set forth in claim 6, wherein said portreplicator has a power switch, and the power switch of said portreplicator is connected via the second docking connector on the main processing unit side and the docking connector on the portreplicator side to said power supply control means of said main body by means of said signal line when the second docking connector on the main processing unit side and the docking connector on the portreplicator side are connected.

11. A file basestation with a keyboard, a CPU, a memory, a main body casing for mounting these and a display unit attached to said main body casing, comprising:

a plurality of external storages;

an external power supply connector for receiving the external power;

a docking connector not only for sending the power received from the external power supply connector to said main body of the information processing unit but also for receiving/sending a signal from/to the main body of the information processing unit; and a casing not only for housing said external storages but also for mounting said external power supply connector and said docking connector.

12. A file basestation as set forth in claim 11, wherein said file basestation has a power switch for starting said file basestation together with the main body of the information processing unit when said main body of the information processing unit and said file basestation are connected via said docking connectors for both.

13. A portreplicator attached to the main body of an information processing unit with a keyboard, a CPU, a memory, a main body casing for mounting these and a display unit attached to the main body casing, comprising:

a plurality of connectors for the signal connection of an external equipment;

an external power supply connector for receiving an external power;

a docking connector not only for sending the power received from the external power supply connector to said main body of the information processing unit but also for receiving/sending a signal from/to the main body of the information processing unit; and a casing for mounting a plurality of said connectors, said external power supply connector and said docking connector.

14. A portreplicator as set forth in claim 13, further comprising:

a power switch for starting said main body of the information processing unit when the main body of the information processing unit and said portreplicator connected via said docking connectors for both.

15. An information processing unit with a CPU, an external storage, a plurality of key switches composing a keyboard and a top plate comprising: a casing for housing the CPU and the external storage, from the top plate of which the key faces of said key switches are exposed, wherein said top plate of said casing has a portion extending from the exposing parts of the key faces toward the front side of properly operating the keyboard and a part of the extending portion forms a palm rest portion, said external storage is housed below the palm rest portion of said top plate inside said casing, and an inorganic antimicrobial agent is applied to at least the outside surface of said palm rest portion of said top plate.

16. An information processing unit or information processing related unit comprising: a device having one end face and a casing for detachably housing the device with the one end face exposed, carrying said casing being restricted by a cylinder lock having an inner cylinder with a key groove formed on one end face, a hook section fixed on the other end face, an outer cylinder for housing the inner cylinder rotatably when inserting a key into the key groove or unrotatably when inserting no key into the key groove and a linking wire with one end attached to the outer cylinder and with a linking portion formed at the other end for being linked to a specified article, wherein a lock hole is formed on said casing which can be inserted into the casing when the hook portion of said cylinder lock is at a specific rotation angle to the casing and cannot come off unless it becomes at the specific rotation angle to the casing once inserted, and said lock hole is formed at a position of the surface of said casing where said other end face of said outer cylinder of the cylinder lock is touchable to said one end face of said device mounted in said casing when the hook section of said cylinder lock is inserted into the lock hole.

* * * * *